(12) United States Patent
Deyaf et al.

(10) Patent No.: US 11,897,421 B1
(45) Date of Patent: Feb. 13, 2024

(54) PRECONFIGURATION OF EMERGENCY VEHICLE DEVICE LOCKABLE FUNCTIONS

(71) Applicant: Feniex Industries, Austin, TX (US)

(72) Inventors: Hamza Deyaf, Austin, TX (US); Kyle Hale, Austin, TX (US); Nicholas Cameron Marth, Austin, TX (US); Aaron Brown, Austin, TX (US); Geoffrey Salazar, Cedar Park, TX (US); Tom Duong, McMahan, TX (US)

(73) Assignee: Feniex Industries, Austin, TX (US)

( * ) Notice: Subject to any disclaimer, the term of this patent is extended or adjusted under 35 U.S.C. 154(b) by 0 days.

(21) Appl. No.: 18/321,108

(22) Filed: May 22, 2023

Related U.S. Application Data

(63) Continuation of application No. 18/154,746, filed on Jan. 13, 2023.

(51) Int. Cl.
*B60R 25/24* (2013.01)
*B60R 25/01* (2013.01)

(52) U.S. Cl.
CPC .............. *B60R 25/24* (2013.01); *B60R 25/01* (2013.01)

(58) Field of Classification Search
CPC ................................ B60R 25/24; B60R 25/01
See application file for complete search history.

(56) References Cited

U.S. PATENT DOCUMENTS

| | | | | |
|---|---|---|---|---|
| 9,218,474 | B1* | 12/2015 | Roth | G06F 21/32 |
| 11,312,295 | B1* | 4/2022 | Deyaf | G06Q 30/0621 |
| 11,312,332 | B1* | 4/2022 | Deyaf | G08B 21/24 |
| 11,312,333 | B1* | 4/2022 | Deyaf | B60R 25/102 |
| 2021/0046899 | A1* | 2/2021 | Uttam | H04W 4/021 |
| 2021/0158639 | A1* | 5/2021 | Westra | H04L 9/3271 |
| 2022/0180679 | A1* | 6/2022 | Wisnia | G07C 9/00571 |
| 2023/0111327 | A1* | 4/2023 | Ling | G06N 3/04 |
| | | | | 345/633 |

* cited by examiner

*Primary Examiner* — Thomas D Alunkal
(74) *Attorney, Agent, or Firm* — Foley IP Law, PLLC

(57) ABSTRACT

Examples provide pre-configuration of emergency vehicle lockable device. A device manager obtains a unique identifier (UID) assigned to a lockable device, such as a multicolor lightbar or a siren device in an uninitialized state. The UID and pre-configuration parameters are received in a request to pre-configure a single device or a batch request to pre-configure a plurality of lockable devices. The device manager updates a lock status of a locked function from a locked state in which the lockable function is inoperable to a pre-unlocked state in accordance with the pre-configuration parameters. The device manager generates, and stores unlock code(s) to unlock the pre-configured lockable function. In response to receiving the UID of a lockable device during initialization, the unlock code(s) are automatically transmitted to a user device associated with the lockable device to unlock and enable the pre-unlocked function to operate in accordance with the pre-configuration parameters.

20 Claims, 19 Drawing Sheets

1700

User Login

User name [                    ]

Password [                    ]

I want to pre-configure functions on a product.

| | |
|---|---|
| Device Connected Status<br>"disconnected" | |
| Lock Status: | Locked |
| Pre-configure: | Additional Function(s) |
| Select option | 200 Watt Amplifier |
| Siren UID: xxx-xx-xx | |

Product Information

- Config Quantum
- Account
- Sign Out
- Help & Resources

Product Information

Product Name: Quantum 60" Lightbar
Product Category: Lightbar
Product Version: 00.00.xx
UID: xxxxxxxx-xxxx-xxxx-xxxx-xxxxxxxxxx-xxx-xxxxx
Product Date: 2023-01-10 00:00:00
Unlock Level: Tri Enter PUID: `XXXXXX-XXXX-XXXX-XXXX-XXXXXXXXXX-XXX-X`

History Log

| Date Time | Activity | User |
|---|---|---|

Device Status

- Unlocked Single — UNLOCK
- Unlocked Dual — UNLOCK
- Tri Color Unlocked — Current Status
- Unlock QUAD — UNLOCK Unlock PUID

US 11,897,421 B1

PRECONFIGURATION OF EMERGENCY VEHICLE DEVICE LOCKABLE FUNCTIONS

BACKGROUND

Many devices are capable of a variety of different functions. For example, a multicolor light-emitting diode (LED) lightbar can emit light in or more different colors as well as flashing those colors in various combinations and flash patterns. A user can configure these types of devices to enable desired functions by connecting the device to a network-enabled computing device and performing a configuration process through a manufacturer webpage or other licensing portal webpage prior to installing the device on an emergency vehicle. However, this configuration process requires the device to be removed from product packaging and connected to the computing device via a wired connection. The user is then required to manually configure each function of the device, which can be time-consuming and burdensome for users that are unfamiliar with the configuration process. Moreover, if the user has multiple devices that are being configured to perform the same functions, the process of configuring each device one at a time is inefficient.

SUMMARY

Some examples provide a system and method for pre-configuring lockable features on emergency vehicle devices. In some examples, a pre-configuration request is received that includes a unique identifier (UID) identifying an emergency vehicle lockable device and identifying a lockable function in a locked state. The function in the locked state is inoperable. The lockable device is in an uninitialized state. The lock status of the lockable function is updated from the locked state to a pre-unlocked state. An unlock code is generated which can unlock the lockable function. The unlock code is stored until the lockable device is initialized. Upon initialization of the lockable device, the unlock code is transmitted to a requesting device, such as a user device communicatively coupled to the lockable device or the lockable device itself. The unlock code pre-configures the lockable device by automatically unlocking one or more functions of the lockable device without manual user configuration of the device functions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 17 is an exemplary screenshot illustrating a user login screen for logging into a pre-configuration webpage.

FIG. 19 is an exemplary screenshot illustrating a pre-configuration page for pre-configuring functions on a lockable device.

FIG. 20 is an exemplary screenshot illustrating a pre-configuration page for pre-configurating functions on a multicolor LED light device.

Corresponding reference characters indicate corresponding parts throughout the drawings.

DETAILED DESCRIPTION

Figure 1:
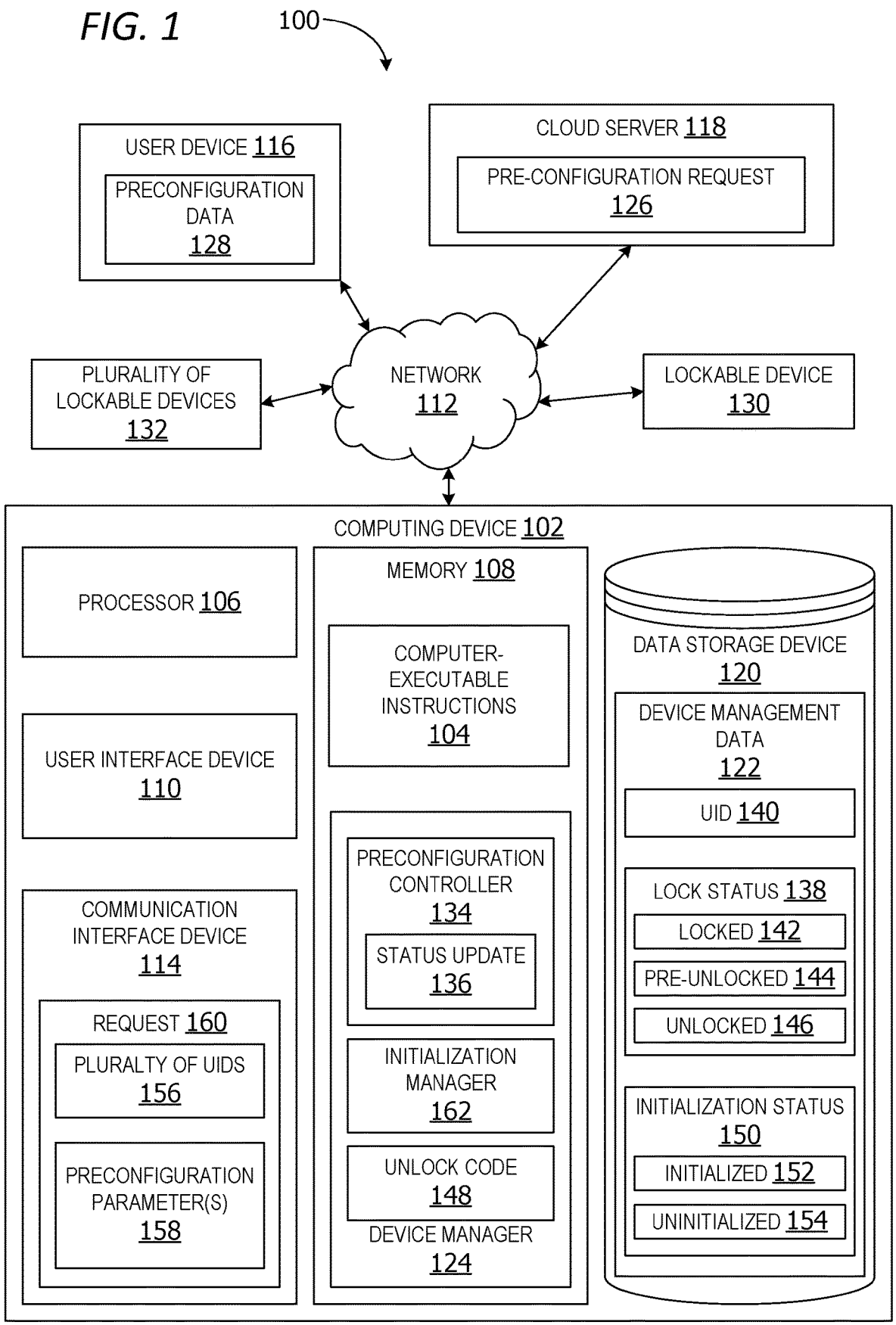
FIG. 1 is an exemplary block diagram illustrating a system for pre-configuration of emergency vehicle lockable devices.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseam.

Multicolor light bars and siren devices are frequently capable of multiple different functions. For example, a quad-color light bar can emit light in four different colors. The final end-user of the lightbar may not want the lightbar to emit all four colors. For example, a tow truck operator may only want amber and white colors while a fire department might require red, blue, and white lights to emit from lightbars on firetrucks. Another end-user might require only blue and red lights. The end-user can configure the devices to emit light in desired colors when the light bar is unboxed and registered by the end-user at the time the device is prepared for installation on a vehicle. However, the registration process requires the user to connect the lightbar to a computer having an internet connection, login to the manufacturer website and then perform an online configuration process which can be time-consuming and burdensome for a user unfamiliar with the process. Moreover, if the end-user is configuring a large number of devices to perform the same functions, the process of connecting each individual device to a networked computing device for configuration of the desired functions becomes frustrating and repetitious.

Referring to the figures, examples of the disclosure enable remote management of available functions on devices, such as multicolor lightbars and siren devices, for installation on emergency vehicles. In some examples, a remote device manager enables customizable pre-configuration of lockable functions on emergency vehicle lockable devices to reduce device initialization time and costs associated with device purchase and installation while providing the maximum number of available function options to meet user needs.

Some aspects of the disclosure enable pre-configuration of lockable devices prior to initialization and configuration of the devices. In some examples, a pre-configuration controller pre-configures an emergency vehicle lockable device by creating unlock codes to unlock features of the lockable device that are initially in a locked or inoperable state at the time of manufacture. The unlock codes are transmitted to the lockable device or a computing device connected to the lockable device when the end-user registers and initializes the device. The unlock codes are used by the lockable device to automatically unlock and enable the locked functions without requiring the end-user to manually configure the functions on the lockable device. This pre-configuration enables quick, easy, and efficient pre-configuration of lockable device functions by manufacturers and/or dealers prior to receipt of the lockable device by an end-user.

Other aspects of the disclosure further enable a configurable lockable device to be pre-configured prior to unboxing the lockable device by the end-user. This reduces network and processor resource usage by the end-user which would have been expended during manual configuration of each lockable device. Moreover, this improves user efficiency and interactions with the lockable device system by streamlining the process of unlocking functions on multiple devices.

In some examples, the system provides a device data management table, such as a database, storing a status of each lockable function on each lockable device. The status of each lockable function can include a locked state in which the device function is inoperable, an unlocked state in which the function is operable, and a pre-lock state in which the device is pre-configured to automatically update at initialization time without the user manually configuring the lockable device. The pre-configuration enables improved flexibility and scalability for locking and unlocking features on lockable devices by manufacturers and dealers prior to receipt and/or installation of the lockable devices by the customers.

Other examples provide an initialization manager which identifies lockable devices being initialized by an end-user using a unique identifier (UID) assigned to each lockable device. The initialization manager automatically transmits unlock codes corresponding to pre-unlocked functions of the lockable devices being initialized. This enables the lockable devices to be unlocked at initialization time without logging into to a configuration website to manually configure the lockable device functions by the customer. The pre-configuration enables reduced user time spent configuring desired features of the lockable devices.

In still other examples, remote pre-configuration of functions on a multicolor light device or siren device enables the user to choose how many lights, light functions, and other configurations the user wishes to activate based on the needs and budget of the end-user. The pre-configuration provides customization of each light or siren device to each user's specific needs while significantly reducing time necessary for the end-user to get the device set-up and ready for installation. This simplifies customer set-up and reduces time spent by dealers and end-users configuring functions on devices.

The device manager executes on a computing device to perform the pre-configuration of lockable device operates in an unconventional manner by providing a streamlined configuration process for lockable features on lockable device, such as multicolor light bars and siren device. In this manner, the computing device operates in an unconventional manner by reducing system resource usage and streamlining user interactions with the system via the user interface, thereby improving the functioning of the underlying computing device.

The system further operates in an unconventional manner by generating and storing pre-configuration unlock codes for a plurality of lockable devices. In this manner, the computing device is used in an unconventional way and allows multifunction emergency vehicle devices to be sold with functions locked to decrease costs and enable stocking of single device type while enabling end-users to initialize devices quickly and easily with desired functions unlocked on each device at installation time without going through a detailed and time-consuming configuration process for each lockable device.

Referring again to FIG. 1, an exemplary block diagram illustrates a system 100 for pre-configuration of lockable devices. In the example of FIG. 1, the computing device 102 represents any device executing computer-executable instructions 104 (e.g., as application programs, operating system functionality, or both) to implement the operations and functionality associated with the computing device 102. The computing device 102 in this example is a device manager server hosting a device manager software component for managing pre-configuration of lockable functions on emergency vehicle lockable devices, such as multicolor LED lightbars and siren devices having multiple lockable functions which can be locked or unlocked to suit the needs and preferences of each unique customer.

The computing device 102, in some examples, includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102, in other examples, includes a user interface device 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 13, FIG. 14, FIG. 15, and FIG. 16).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface device 114. The communications interface device 114 includes a network interface card and/or computer-executable instructions (e.g., a driver) for operating the network interface card. Communication between the computing device 102 and other devices, such as but not limited to user device 116 and/or cloud server 118, can occur using any protocol or mechanism over any wired or wireless connection. In some examples, the communications interface device 114 is operable with short range communication technologies such as by using near-field communication (NFC) tags.

The user device 116 represent any device executing computer-executable instructions. The user device 116 can be implemented as a mobile computing device, such as, but not limited to, a wearable computing device, a mobile telephone, laptop, tablet, computing pad, netbook, gaming device, and/or any other portable device. The user device 116 includes at least one processor and a memory. The user device 116 can also include a user interface component.

The cloud server 118 is a logical server providing services to the computing device 102 or other clients, such as, but not limited to, the user device 116. The cloud server 118 is hosted and/or delivered via the network 112. In some non-limiting examples, the cloud server 118 is associated with one or more physical servers in one or more data centers. In other examples, the cloud server 118 is associated with a distributed network of servers.

The system 100 can optionally include a data storage device 120 for storing data, such as, but not limited to data management data 122. The data management data 122 is data associated with managing pre-configuration of a lockable device, such as, but not limited to, a siren device or a multicolor light device.

A lockable device is a lockable device having one or more lockable functions. A lockable function can include a color, a flash pattern, type of siren sound, or any other type of function. For example, if the lockable device is a quad color light having a set of red lights, a set of blue lights, a set of white lights and a set of amber lights, the device function(s) associated with activating these lights are locked prior to shipping or otherwise releasing the light device to a dealer or end-user. In some examples, while the quad color light functions are in the locked state, none of the lights are capable of activating.

The data storage device 120 can include one or more different types of data storage devices, such as, for example, one or more rotating disks drives, one or more solid state drives (SSDs), and/or any other type of data storage device. The data storage device 120 in some non-limiting examples includes a redundant array of independent disks (RAID) array. In other examples, the data storage device 120 includes a database for storing the device management data 122, such as, but not limited to, a device management table.

The data storage device 120, in this example, is included within the computing device 102, attached to the computing device, plugged into the computing device, or otherwise associated with the computing device 102. In other examples, the data storage device 120 includes a remote data storage accessed by the computing device via the network 112, such as a remote data storage device, a data storage in a remote data center, or a cloud storage.

The memory 108 in some examples stores one or more computer-executable components. Exemplary components include a device manager 124 for pre-configuring lockable functions on a lockable device. In some examples, the device manager 124 receives a pre-configuration request 126 for pre-configuring one or more lockable devices. The pre-configuration request 126 includes pre-configuration data 128 and a UID 140 associated with a lockable device. In some examples, the pre-configuration data 128 includes the UID 140 and/or an identification of lockable device functions and sub-functions which are to be unlocked at initialization time.

In some example, initialization time refers to the first time the lockable device is connected to a user device for initialization. Initialization can occur when the customer connects the lockable device to the user device via a universal serial bus (USB) or other wired or wireless connection. In these examples, the user device uses pre-configuration unlock codes to unlock pre-configured functions of the lockable device during initialization.

A sub-function is a function associated with another functions, such as, but not limited to, the flash pattern or flash speed of a given light color. For example, a lockable red colored light has sub-functions including the flash pattern and flash speed of the red light. The light color is the primary function and the flash pattern, and the flash speed of that light color are sub-functions of the primary function.

The UID 140 is a unique identifier assigned to each lockable device. The UID 140, in some examples, is assigned to a lockable device at the time the lockable device is manufactured. Thus, if two lockable devices are created, each lockable device is assigned a different UID. The UID in this example is stored on the data storage device 120 on the computing device 102. However, in other examples, the UID 140 is stored on a cloud storage or other data store remote from the computing device 102.

The pre-configuration data 128 is generated by a user in this example. The pre-configuration data 128 includes parameters for pre-configurating the lockable device. For example, if the user wants to pre-configure an LED quad-color lightbar to flash three colors in two different flash patterns, the pre-configuration data 128 includes an identification of the three colors that are to be unlocked and an identification of the two flash patterns desired by the user.

The pre-configuration request 126, in some examples, is received from the user device 116 and/or the cloud server 118 via the network 112. However, in other examples, the pre-configuration data 128 is input into the computing device 102 via an input device associated with the user interface device 110. In such cases, the pre-configuration data 128 can be provided to the device manager 124 in an absence of a network connection.

In some examples, the pre-configuration data 128 provided via a pre-configuration request 126 includes data for pre-configuring a single lockable device 130. In these examples, the pre-configuration data includes a single UID 140 associated with the lockable device 130 and an identification of one or more lockable functions in an initial locked state for pre-configuration.

In other examples, the pre-configuration data 128 is provided via a pre-configuration request 160 to pre-configure a plurality of lockable device 132. The plurality of lockable devices 132 includes two or more uninitialized lockable devices, such as, but not limited to, lockable siren devices and/or lockable multicolor lightbar devices. In these examples, the pre-configuration data 128 includes a plurality of UIDs 156 associated with the plurality of lockable devices 132. The pre-configuration data 128 associated with this batch pre-configuration request also includes pre-configuration parameter(s) 158 identifying one or more functions of the plurality of lockable device 132 to be pre-unlocked during the pre-configuration.

The device manager 124 includes a pre-configuration controller 134. The pre-configuration controller 134 performs a status update 136. The status update 136 of a lock status 138 for each lockable feature of the lockable device 130 associated with the UID 140. In this example, the status for an uninitialized lockable device 130 includes a locked 142 status or a pre-unlocked 144 status. The locked 142 status is an initial status of the lockable features. In this example, all lockable features are initially placed in a locked 142 status. In such cases, the lockable features are initially inoperable at time of manufacture. When the lockable device 130 is received by a user in an unconfigured and uninitialized state, the lockable functions are inoperable.

In other examples, one or more lockable features are initially placed in a default unlocked 146 state. For example, if the lockable device 130 is a quad-color light bar, one single color is placed into a default unlocked 146 state. In such cases, all the quad-color light bars are enabled to emit a single color at time of manufacture. However, the other three available colors are placed in a locked state at time of manufacture rendering these additional colors inoperable. In one example, the lockable device 130 is a quad-color lightbar capable of emitting the colors red, blue, white, and amber. In this example, the color red is initially unlocked while the colors red, blue, and white are locked at time of manufacture.

The lock status 138 for lockable features in a lockable device after initialization is a locked 142 state or an unlocked 146 state. A lockable function in the locked state is disabled. The lockable function in an unlocked state is enabled for normal operation. The pre-unlocked 144 state is a state in which the lockable function is still disabled on the lockable device, however, the lockable function is pre-configured for automatic unlock when the lockable device is initialized.

The lockable device is initialized when the lockable device is connected to a network or communicatively coupled to a user device 116 which is connected to a network for registration of the device. During initialization, the UIL of the lockable device is provided to the device manager 124. The device manager 124 transmits unlock codes to unlock pre-configured features of the device without requiring the user to manually configure the lockable device.

The user configures the lockable device by logging into a pre-configuration webpage or portal website to access configuration options for a given lockable device. In some examples, the user logs into the pre-configuration website after unboxing the lockable device and provides a UIL for the lockable device. The pre-configuration website then presents the user with options for licensing and unlocking various functions of the lockable device via a user interface, such as the user interface device 110 and/or a user interface on the user device 116.

In some examples, the device manager 124 generates an unlock code 148 to unlock one or more pre-unlocked functions of the lockable device. The unlock code 148 in some examples, is a code to unlock a single lockable function of the lockable device. In other examples, the unlock code is a code to unlock two or more lockable functions of the lockable device.

The unlock code 148 is a unique device-specific code. Thus, the device manager 124 generates a unique unlock code for each unique lockable device. In this example, if the user is pre-configuring two different lockable devices, the device manager 124 generates at least one unlock code for the first lockable device and a second, different unlock code for the second lockable device. The unlock code is stored in the data storage device 120 on the computing device, stored on a cloud storage, or other remote data store until initialization of the lockable device.

The unlock code, in some examples, enables operation of the function(s) for a predetermined time-period during which a license is effective. In other examples, the unlock code enables operation of the selected function(s) indefinitely or until the function(s) are re-locked.

In some examples, the lockable function(s) are specified in the pre-configuration data in accordance with at least one parameter specified in the pre-configuration data. A parameter is a rule, definition or specification describing, limiting, or otherwise defining a function of the lockable device or sub-function of the primary lockable function.

In some examples, a parameter details a length of time a license (unlock) is effective, warranty details, license fees, etc. A parameter can also specify function options selected by a user. For example, if a user chooses to unlock all four light colors in a quad color light device, the user can select which color combinations should light up together in response to a user activating one or more controls. A parameter can specify that a siren device emit a standard wailing siren sound activated in normal mode when an "emergency" control switch is activated while the vehicle is in motion but go silent when the emergency vehicle is placed in park.

In some examples, the device manager 124 optionally stores an initialization status 150 of each lockable device in a data store, such as, but not limited to, the data storage device 120. In this example, the initialization status 150 indicates whether a given lockable device associated with a given UIL is initialized 152 or uninitialized 154. The pre-configuration of the device occurs prior to initialization. After initialization, changes to the lock status of lockable functions are performed via a manual configuration of the lockable device through the post-initialization configuration process in which the user logs into the user's account to access the configuration page for their registered lockable devices.

Upon initialization of the lockable device 130, the initialization manager 162 transmits the unlock code 148 to an application on the user device which is communicatively coupled to the lockable device, such as, but not limited to, the user device 116. In this example, the user device 116 transmitting the pre-configuration data 128 for pre-configuring the lockable device is the same user device receiving the unlock code for unlocking the lockable device locked functions. The user device is communicatively coupled to the lockable device via a wired or wireless connection, such as, but not limited to, a USB connection.

In other examples, the user device transmitting the pre-configuration data is a different user device than the user device receiving the unlock code. In this manner, a dealer or other party can pre-configure a device prior to receipt and initialization of the device by a different end-user. The user device receiving the unlock code provides the code to the lockable device via a wired or wireless network connection. The unlock code enables the lockable device to unlock the selected locked functions. Once unlocked, the selected function is enabled to operate normally. For example, if the locked function is a specific type of sound emitted by a siren device, the siren device is enabled to produce that specific type of sound once the selected function is unlocked using the unlock code.

Figure 2:
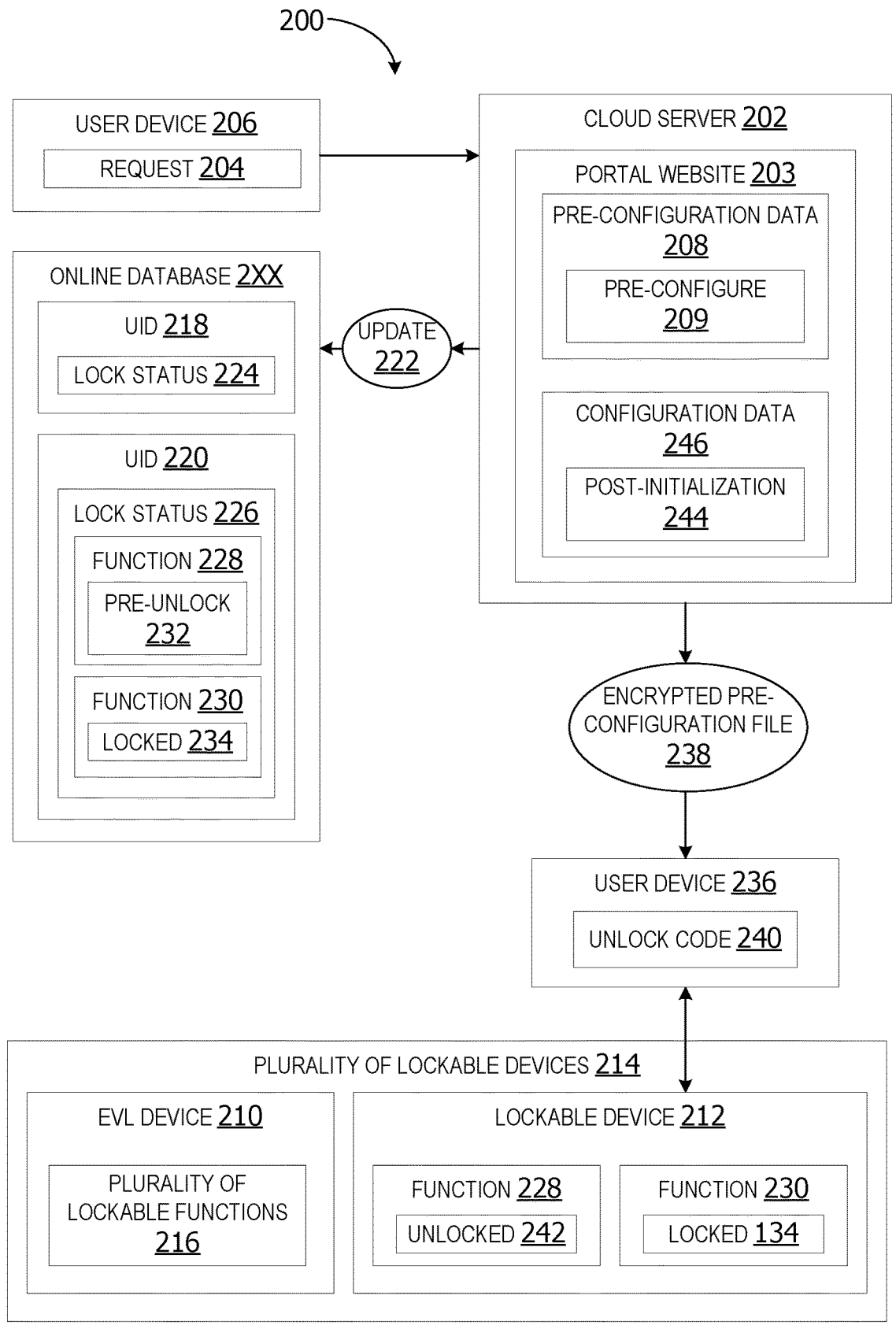
FIG. 2 is an exemplary block diagram illustrating a system for pre-configuring lockable devices based on pre-configuration data received prior to device initialization.

FIG. 2 is an exemplary block diagram illustrating a system 200 for pre-configuring lockable devices based on pre-configuration data received prior to device initialization. In some examples, the device manager executing on a cloud server 202 receives a pre-configuration request 204 from a user device 206. The cloud server 202 is a cloud-based server, such as, but not limited to, the cloud server 118 in FIG. 1. The user device 206 is a computing device having a processor and memory, such as, but not limited to, the computing device 102 and/or the user device 116 in FIG. 1. In this example, the cloud server 202 is a device manager server for managing pre-configuration of functions on lockable devices.

In some examples, the first user device 206 generates the pre-configuration data by logging into a webpage, such as a portal website 203. A user associated with the first user device 206 logs in and provides the UID for each lockable device the user wants to pre-configure. The lockable device is not communicatively coupled to the first user device. In some examples, the lockable device is not powered up, plugged-in, or connected to the user device or a power supply at pre-configuration time. In an example scenario, the lockable device remains in a product packaging or box during pre-configuration such that it is unnecessary to unbox the lockable device until initialization of the lockable device.

While logged into the portal website 203, the user provides a UID associated with a lockable device. The user then selects pre-configuration options for each of the lockable features on the lockable device associated with the provided UID. In some examples, the user generates pre-configuration data for pre-configuring a single device associated with a single UID while logged into the portal website. In other examples, the user provides a plurality of UIDs for a plurality of lockable devices. The user pre-configures the plurality of lockable devices as a batch. In this manner, multiple devices are pre-configured at once. In these examples, all the lockable devices in the batch are pre-configured in accordance with the same parameters. For example, if the user wants to pre-configuration a dozen light devices to emit a red and white flashing light pattern, the user can provide the dozen UIDs for the dozen light devices and generate the configuration data to unlock the functions that enable the red and white flashing light patterns.

The request 204, in this example, includes pre-configuration data 208 to pre-configure 209 a lockable device in a plurality of lockable devices 214, such as, but not limited to, the lockable device 210 and/or the lockable device 212. A lockable device in the plurality of lockable devices 214 includes emergency vehicle siren devices and/or emergency vehicle light device, such as, but not limited to, a quad-color LED lightbar. Each lockable device in the plurality of lockable device 214 is capable of performing a plurality of lockable functions 216.

In this example, the UID 218 is assigned to the lockable device 210. Likewise, the UID 220 is assigned to the lockable device 212. The request 204, in this example, includes pre-configuration data 208 to pre-configure the lockable device 212. The request 204 includes the UID 220 associated with the lockable device 212.

The device manager performs an update 222 of the lock status of the lockable devices. In this example, the lock status of the lockable device 210 shows the lockable function of the lockable device 210 is in a locked state. The lock status 226 of the lockable functions of the lockable device 212 are updated.

In this example, the lockable device 212 includes a first lockable function 228 and a second lockable function 230 are initially in a locked 142 state. The device manager updates the first lockable function 228 lock status of the lockable device 212 from the locked state to the pre-unlocked 232 state in accordance with the pre-configuration data 208. The locked state of the second lockable function is not pre-configured. Therefore, the locked state of the second lockable function 230, in this example, remains unchanged.

The device manager generates an unlock code 240 to unlock the lockable function 228 during initialization of the lockable device 212. The lockable function 228 remains inoperable, such that the lockable function 228 does not operate in the pre-unlock 232 state. The function 228 remains inoperable until the function is unlocked via an unlock code transmitted to the lockable device 212.

In some examples, when a user is ready to initialize the lockable device 212, a second user device 236 is communicatively coupled to the lockable device 212 at initialization time. While connected to the user device 236, the device manager transmits an encrypted pre-configuration file 238, including an unlock code 240, to the user device 236. The user device 236 decrypts the pre-configuration file and obtains the unlock code 240.

The pre-configuration file, in some examples, is encrypted using cryptographic keys, such as, but not limited to, a public key and private key. For example, the cloud server encrypts the pre-configuration file using a public key. The user device uses a private cryptographic key corresponding to the public key to decrypt the file to obtain the unlock code. The unlock code is used by the user device to unlock the locked function.

The unlock code 240 unlocks the function 228. The status of the function 228 is changed from the per-unlocked state to an unlocked 242 state. In the unlocked state, the function 228 operates normally.

After initialization, the lockable device 212 is ready for installation on an emergency vehicle. In this example, when the lockable device 210 is initialized, the lockable functions on the lockable device 210 remain locked because no pre-configuration request was made with regard to lockable device 210 in this example.

In some examples, a user can optionally perform a post-initialization 244 configuration of the lockable device 210 or make additional changes to the lockable functions on the lockable device 212. For example, a user can connect the lockable device 210 to the user device 236 to perform a post-initialization configuration of the lockable device 210. In this example, the lockable device 210 is connected to the user device 236. A UID is obtained from the lockable device. The user logs into the portal website and opens a configuration page. The user selects the locked functions that the user wants to unlock. The user then performs a licensing operation to unlock the desired functions in accordance with the configuration data 246.

In another example, the lockable function 230 remains locked 142 after initialization and pre-configuration is complete because the lockable function 230 was not pre-configured. In this example, the user can optionally connect the lockable device 214 to the user device 236 and perform a manual post-initialization configuration of the lockable device 212 to unlock the function 230 if the user wants to enable both the function 228 and the function 230.

In this example, the lockable device is not network enabled. The lockable device is connected to a user device via a wired connection to receive the unlock code for unlocking one or more locked functions of the lockable device. Some examples of wired connections include, without limitation, USB, RJ-45, Ethernet. However, in other examples, the lockable device includes a network device. In these examples, the lockable device connects to the cloud server or the user device wirelessly to obtain the unlock code from either the user device or the cloud server when the device is in range of a Wi-Fi hotspot.

Figure 3:
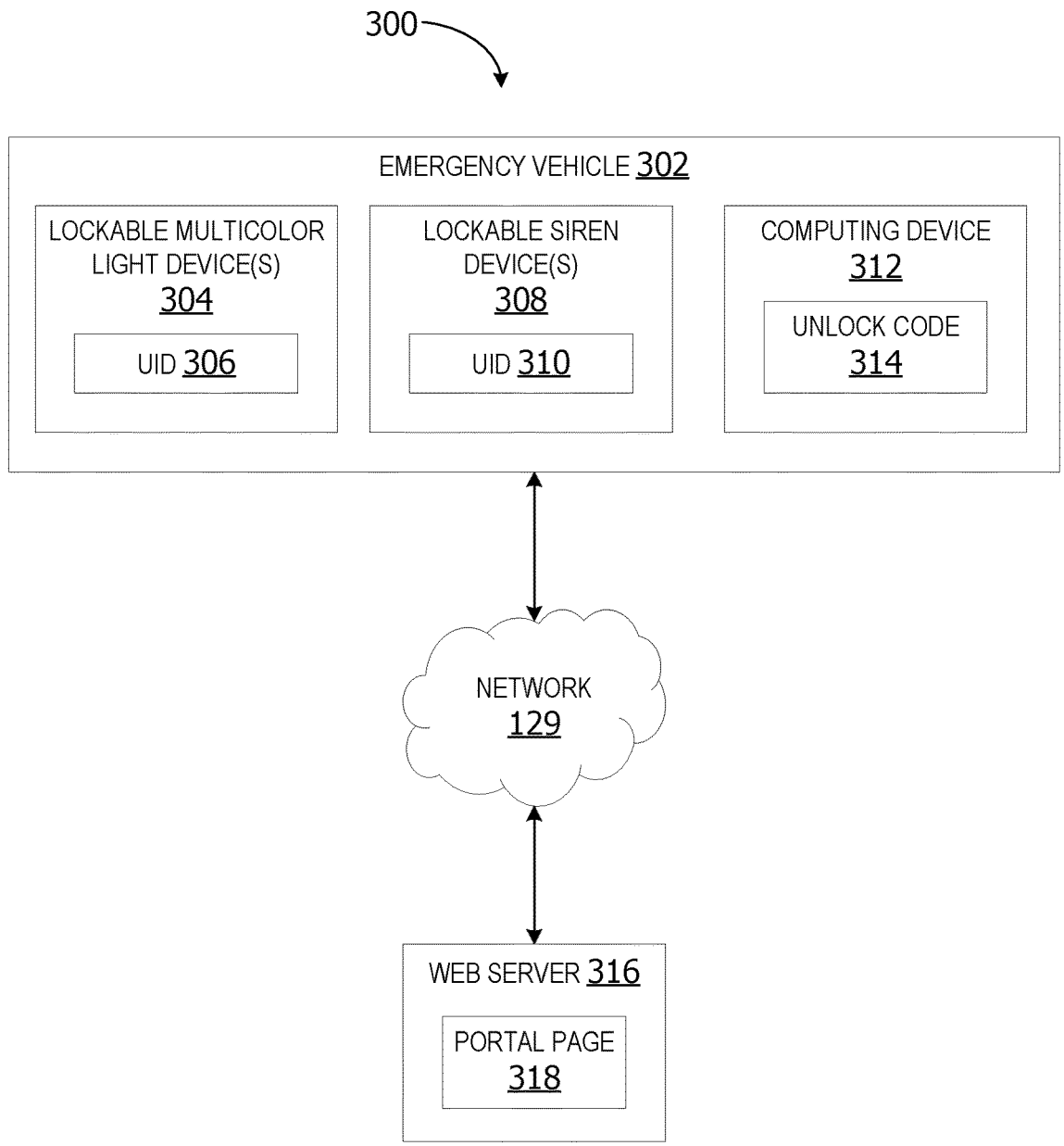
FIG. 3 is an exemplary block diagram illustrating a system for unlocking one or more functions on one or more lockable devices installed on an emergency vehicle.

Referring now to FIG. 3, an exemplary block diagram illustrating a system 300 for unlocking one or more functions on one or more lockable devices installed on an emergency vehicle 302 is shown. The emergency vehicle 302 is implemented as any type of emergency vehicle, such as, but not limited to, a police car, police truck, ambulance, tow truck, fire truck, search and rescue vehicle, police motorcycle, etc.

The emergency vehicle 302, in this non-limiting example, includes one or more lockable devices installed on the emergency vehicle 302. In some examples, the lockable devices are pre-configured prior to initialization and installation of the lockable device on the emergency vehicle 302.

The emergency vehicle 302, in some examples, includes one or more lockable multicolor light device(s) 304, such as, but not limited to, a lightbar device having two or more colored lights. In this example, the lockable multicolor light device(s) 304 is a quad lightbar. The lockable multicolor light device is assigned a UID 306.

In other examples, the emergency vehicle 302 includes one or more lockable siren device(s) 308. A siren device is a device for emitting an audible siren sound. A UID is assigned to each lockable siren device.

In this example, the lockable device(s) on the emergency vehicle 302 are pre-configured prior to initialization and installation onto the emergency vehicle 302. However, the lockable device(s) are not unlocked until an unlock code is provided to the lockable device(s). In some examples, the emergency vehicle 302 includes an onboard computing device 312. The onboard computing device includes a processor and memory. The computing device receives the unlock code 314 to unlock one or more functions on the lockable multicolor light device or the lockable siren device from the web server 316 via the network 129. A unique unlock code is required for the lockable multicolor light device and a different unlock code is required to unlock function(s) on the lockable siren device.

In other examples, the web server 316 is a computing device or cloud server for hosting a web page or portal page 318. The user can utilize the computing device connected to the lockable device to unlock one or more functions of the lockable devices without detaching the lockable device from the emergency vehicle.

The examples are not limited to connecting the lockable device(s) to a computing device while installed on an emergency vehicle. In other examples, a lockable device is attached to a user device or other computing device before the lockable device is installed on an emergency vehicle 302 and/or the lockable device is uninstalled from the emergency vehicle when the user wants to configure or re-configure the lockable device to unlock additional functions.

Figure 4:
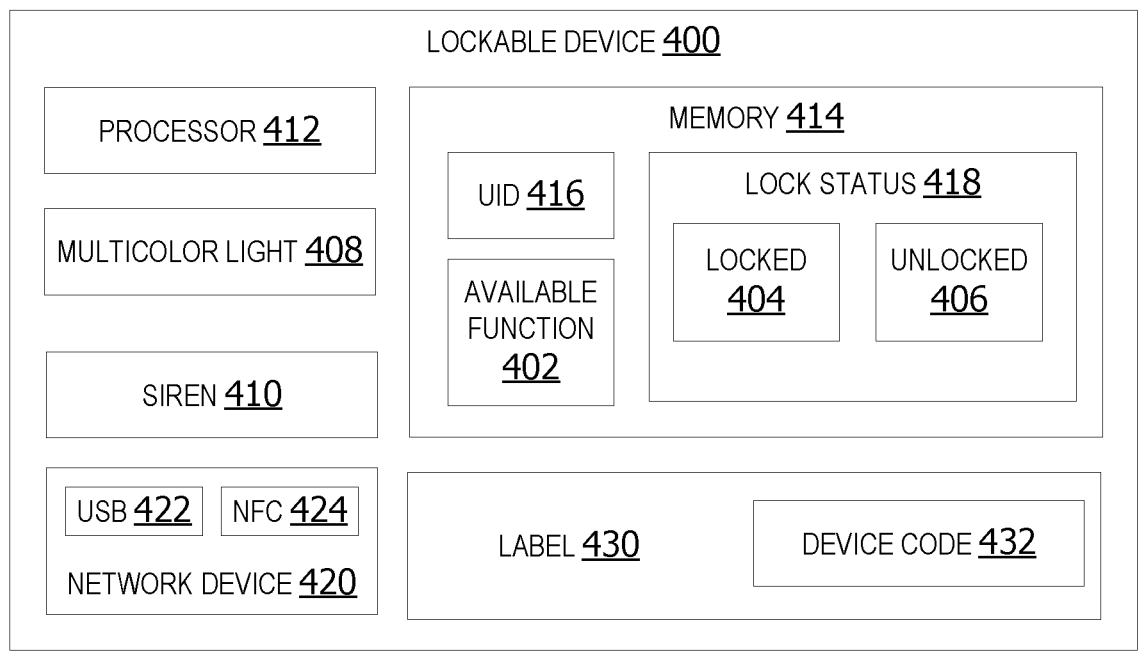
FIG. 4 is an exemplary block diagram illustrating a lockable device including at least one available function capable of being locked or unlocked.

FIG. 4 is an exemplary block diagram illustrating a lockable device 400 including at least one available function 402 capable of being locked 404 or unlocked 406. In this non-limiting example, the lockable device 400 is a multicolor light 408 or a siren 410 device. However, in other examples, the lockable device is implemented as any type of device capable of having one or more functions in a locked 404 state, pre-unlocked state and/or unlocked 406 state.

In some examples, the lockable device 400 includes a processor 412 and a memory 414 storing a UID 416 and/or a lock status 418 of the available function 402. The lockable device 400 also includes a network device 420 enabling the lockable device to communicatively couple to a computing device, such as, but not limited to, the user device 116 in FIG. 1. In some examples, the lockable device connects to the user device via a wired network connection, such as, but not limited to, ethernet or a USB 422 port. In other examples, the lockable device wirelessly connects to the user device via Wi-Fi, NFC, Bluetooth®, UWB, or any other type of wireless communication using TTL or SSL for encrypted communication.

In this example, the locked 404 function(s) can be preconfigured such that the locked 404 function(s) are automatically unlocked when the device is initialized following removal of the lockable device 400 from the product packaging and connected to a user device or a network during an initial registration of the lockable device 400.

The initial registration takes place when a user registers the lockable device 400 with a manufacturer and/or dealer's webpage. In some examples, the user provides the UID of the lockable device 400 along with the user's name and other contact information of the user within one or more text fields of a registration webpage. In some examples, the user registers the lockable device 400 by connecting to a cloud server or other server hosting a registration webpage via a user device. In other examples, the user registers the lockable device 400 while the lockable device 400 is connected to the user device via a wired or wireless connection. In this example, the lockable device 400 is connected to a user device via a universal serial bus (USB) wired connection.

In this example, the lockable device includes a device code 432 printed on a label 430 or other portion of a product packaging, such as a box or package enclosing the lockable device. The device code 432 is a quick response (QR) code, a barcode, a matric barcode, a serial number, or other unique identifier. In some examples, the user scans the device code 432 with a scanner device, such as a QR code reader, barcode reader, etc. The device code 432 can also be read using an application on a phone or other mobile device.

In some examples, the UID is optionally obtained from the device code 432 without removing the lockable device from the product packaging. In other words, the user can obtain the UID of the boxed lockable device without unboxing the lockable device. The UID is used to pre-configure the lockable device without removing the lockable device from the product packaging.

Figure 5:
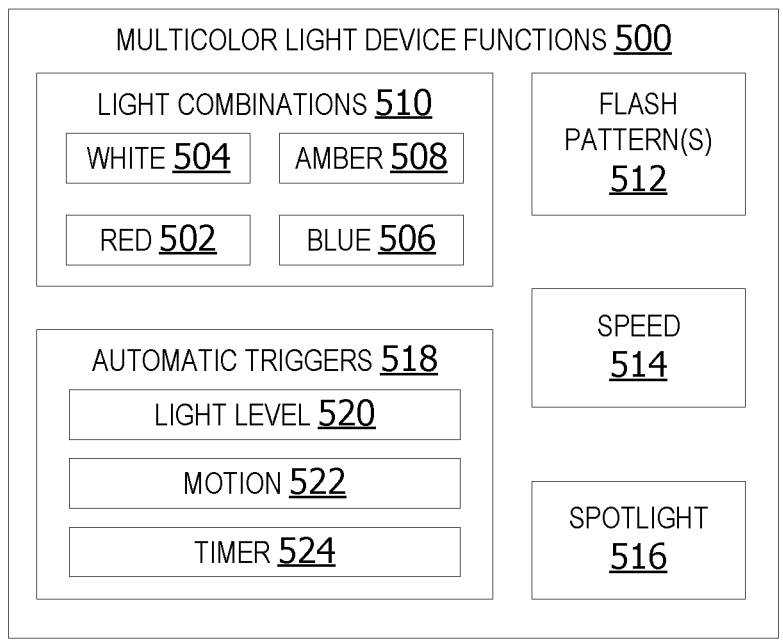
FIG. 5 is an exemplary block diagram illustrating multi-color light device functions.

FIG. 5 is an exemplary block diagram illustrating multicolor light device functions 500. A multicolor light device is a lockable device having two or more colored lights, such as, but not limited to, a dual colored lightbar, a tri-color lightbar, a quad color lightbar or a lightbar having five or more different colored lights. In this example, the multicolor light device is a quad color light device having the colors red 502, white 504, blue 506 and amber 508. The multicolor light device is a light-emitting diode (LED) quad color light. The multicolor light device functions 500 are optionally pre-configured using a UID of the multicolor light device prior to initialization of the multicolor light device.

The light colors, in this example, are lockable. Thus, the multicolor light device can be sold or leased to a customer with all four light colors disabled such that the light device does not function as a light at all unless at least one light color is licensed. In other examples, the light device is sold or shipped to a dealer/customer as a single-color light device having three of the four colors locked and only a single color unlocked for use. In these examples, when a dealer or end user receives the light device, only a single color is operable. If the amber 508 is operable, the multicolor light device only functions to illuminate the amber lights while the red, blue, and white lights remain inoperable until the dealer or user chooses to unlock one or more of the lights or light combination 510. The locked multicolor light device functions 500 can be unlocked during a pre-configuration process prior to shipping the light device to the dealer/customer, prior to unboxing the light device, and/or before initializing an unboxed light device.

A light combination 510 is a combination of two or more lights in the available light colors on the multicolor light device which are operable. In one example, a light combination 510 can include red and blue while the white and amber are inoperable. In this case, the light device functions as a dual color light capable of flashing red and blue lights in one or more flash pattern(s) 512.

In another example, a light combination 510 can include all four colored lights unlocked for use. In this example, there may be dozens of possible flash patterns available enabling the user to choose to flash a single-color light, two lights, three lights or all four lights in various possible flash patterns.

Other functions on a multicolor light device can include speed 514 of a flashing light. A light or combination of lights can flash on and off at different speeds. The speed 514 option enables a user to select one or more speeds of light flashing in one or more flash patterns for one or more lights in the possible light combinations.

A spotlight 516 function enables an LED light on the multicolor light device to shine a steady light in one or more directions like a spotlight. The automatic triggers 518 include one or more user-configurable triggers for automatically turning a light or combination of lights on or off. A light level 520 can trigger a light turning on or off. For example, a light can be programmed to turn on when ambient light levels fall below a minimum threshold level, such as, but not limited to, automatically turning on headlights at sunset. In another example, a light function can optionally include a function that automatically turns the light device off in response to a light level exceeding a threshold light level, such as, but not limited to, headlights turning off when exterior light levels make headlights unnecessary.

A motion sensor detecting motion 522 can trigger a function that automatically activates or de-activates one or more lights. For example, a light can be programmed to turn on if movement is detected near a vehicle or if a user comes into contact with the vehicle.

A timer 524 function can enable programming a light or combination of lights to activate (turn on) or de-activate (turn off). For example, a light can be programmed to automatically turn off after a pre-determined period of time or automatically turn on at a given time. Any one or more of the above functions can be pre-configured prior to initialization of a multicolor light device.

Figure 6:
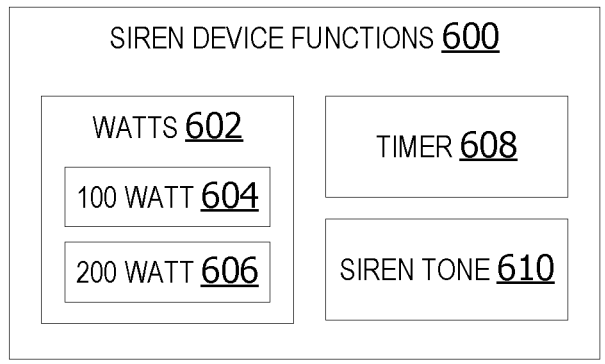
FIG. 6 is an exemplary block diagram illustrating siren device functions.

Turning now to FIG. 6, an exemplary block diagram illustrating siren device functions 600 is shown. The siren device functions 600 are functions which can be pre-configured by the device manager. The siren device functions can include a number of watts 602. For example, the siren device can operate as a 100-watt 604 siren device or a 200-watt 606 siren device. The siren device can include a timer 608 function and siren tone 610. A siren tone 610 refers to the diverse types of siren sounds having differences in pitch and progression. For example, a siren tone can include an airhorn, wail, yelp, piece, scan, warble, or any other type of siren sound.

Figure 7:
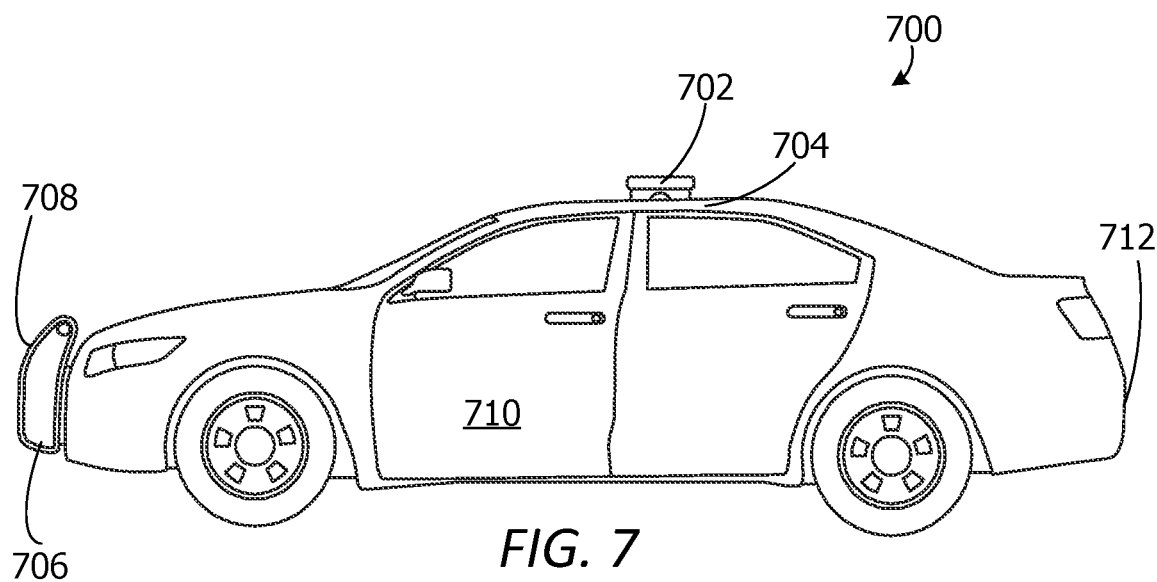
FIG. 7 is an exemplary block diagram illustrating an emergency vehicle sedan including at least one lockable device.

FIG. 7 is an exemplary block diagram illustrating an emergency vehicle sedan 700 including at least one lockable device. In this example, the lockable device is a multicolored lightbar installed on an exterior surface of a roof 704 of the vehicle. The multicolored lightbar is a lockable device which is pre-configured and initialized prior to installation on the exterior surface of the roof 704 of the vehicle sedan 700. The vehicle sedan 700 can also include a siren device 706 mounted under or proximate to the lightbar 702. In other examples, the vehicle sedan 700 can include a lightbar mounted to a front grill 708, a door 710, a rear bumper 712 or any other part of the vehicle.

Figure 8:
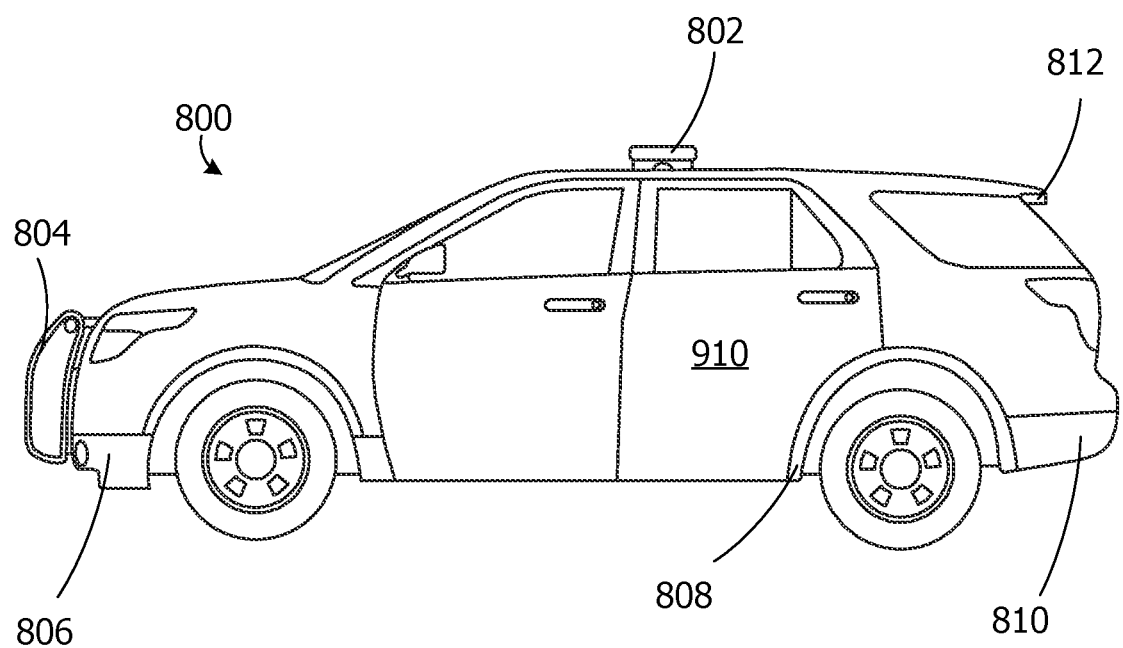
FIG. 8 is an exemplary block diagram illustrating an emergency vehicle sport utility vehicle (SUV) including at least one lockable device.

FIG. 8 is an exemplary block diagram illustrating an emergency vehicle sport utility vehicle (SUV) 800 including at least one lockable device. In this example, the lockable device is a multicolor LED lightbar 802 mounted to the roof of the vehicle 800. The vehicle, in this example, also includes a lockable siren device 804 mounted on the roof below or proximate to the lightbar 802. Other lockable devices on the vehicle 800 can include a multicolor LED light mounted to a front bumper 806, a wheel rim 808, a bumper 810 and/or a rear lightbar 812. The multicolor LED lightbar 802 is mounted onto the vehicle 800 after pre-configuration and initialization of the multicolor LED lightbar 802.

Figure 9:
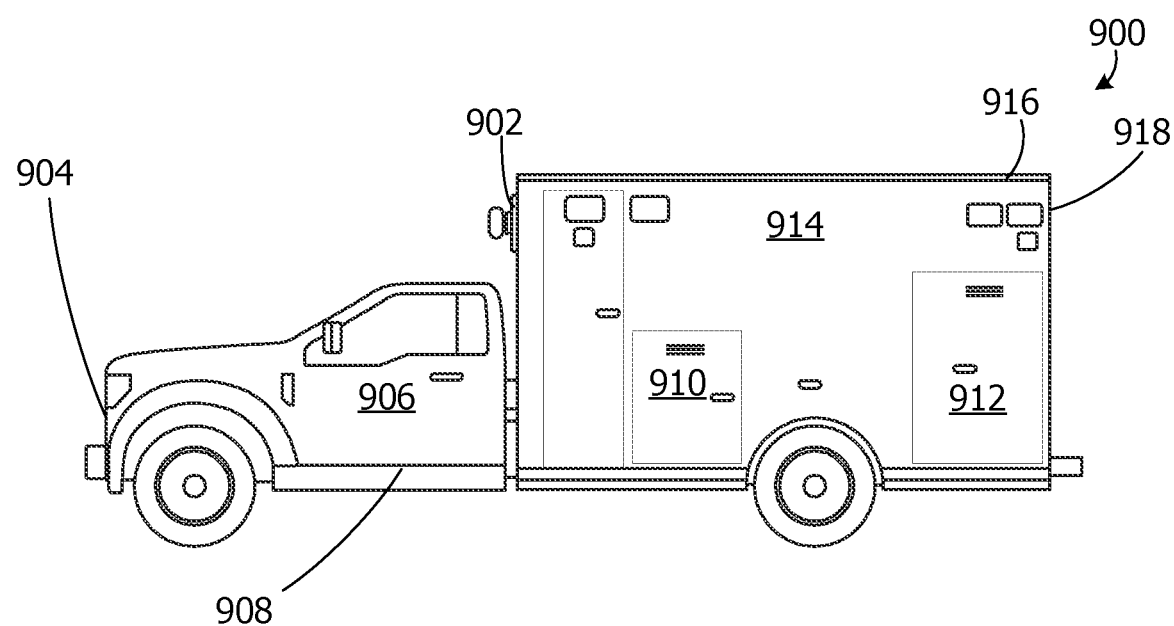
FIG. 9 is an exemplary block diagram illustrating an emergency vehicle truck 900 including at least one lockable device.

FIG. 9 is an exemplary block diagram illustrating an emergency vehicle truck 900 including at least one lockable device. In this example, the lockable devices installed on the truck 900 includes a multicolor lightbar 902 having one or more functions which can be locked at manufacture and pre-configured by a user prior to installation on the emergency vehicle truck 900. The lockable devices optionally also include a siren device 904 having a lockable 200-watt functionality which can be unlocked prior to initialization of the siren device via pre-configuration of the device functions. The locked functions of the multicolor lightbar and/or the siren device are unlocked automatically in accordance with pre-configuration data when the multicolor lightbar 902 and/or the siren device is connected to a network to obtain the unlock code from the device manager or connected to a user device having the unlock code.

The vehicle can optionally also include one or more additional lockable multicolor light devices mounted on an interior or exterior of the truck. For example, a lockable multicolor light device can be mounted to locations such as, but not limited to, a running board 908, compartment door 910 and 912, side 914, roof 916, back 918 and/or any other portion of the vehicle truck 900.

Figure 10:
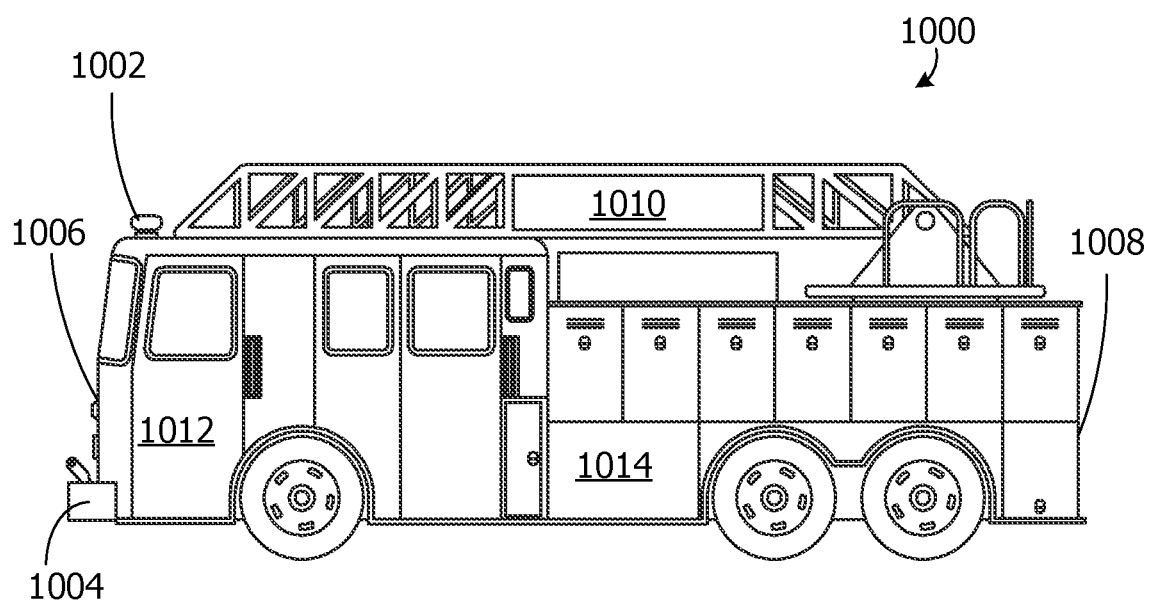
FIG. 10 is an exemplary block diagram illustrating an emergency vehicle firetruck including at least one lockable device.

FIG. 10 is an exemplary block diagram illustrating an emergency vehicle firetruck 1000 including at least one lockable device. In this example, a lockable multicolor LED lightbar 1002 is mounted to a roof of a firetruck cab. A siren device can be mounted to a roof, front bumper 1004 or front grill 1006 of the firetruck. Multicolor LED lights can also be mounted on the side 1014, back 1008, ladder 1010 and/or door 1012 of the firetruck 1000. The multicolor LED lightbar 1002 and/or the siren device are pre-configurable lockable devices having unlocked functions which are pre-configured to unlock prior to installation of the multicolor LED lightbar and/or siren device onto the firetruck 1000.

Figure 11:
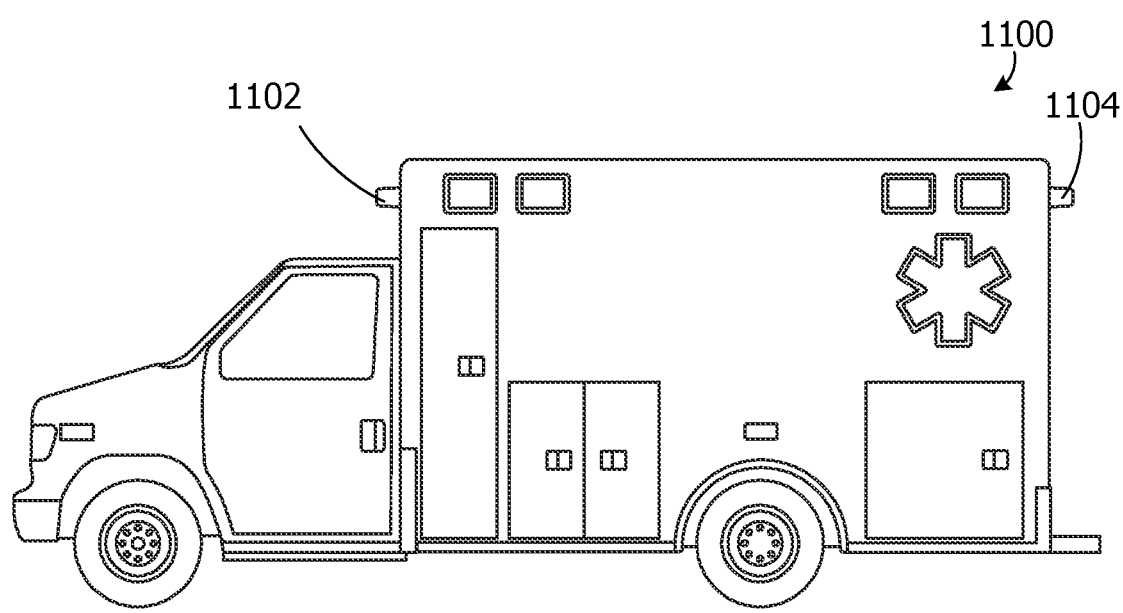
FIG. 11 is an exemplary block diagram illustrating an emergency vehicle ambulance including at least one lockable device.

Referring now to FIG. 11, an exemplary block diagram illustrating an emergency vehicle ambulance 1100 including at least one pre-configurable, lockable device is shown. In this example, a lockable multicolor LED lightbar 1102 is mounted to a front portion of the ambulance above the cab and another multicolor LED lightbar 1104 is mounted to a back portion of the ambulance. In other examples, the lockable devices can include one or more siren devices as well as one or more additional lockable multicolor light devices.

Figure 12:
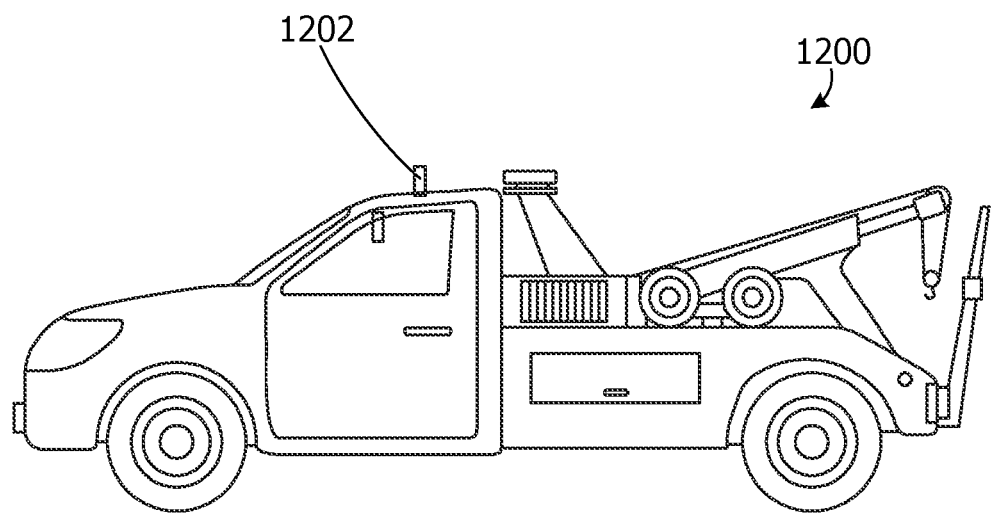
FIG. 12 is an exemplary block diagram illustrating an emergency vehicle tow truck including at least one lockable device.

FIG. 12 is an exemplary block diagram illustrating an emergency vehicle tow truck 1200 including at least one pre-configurable, lockable device. The tow truck includes a lockable multicolor lightbar 1202 mounted to the exterior surface of the roof of the tow truck. In other examples, the tow truck can include one or more siren devices and/or one or more lockable multicolor light devices mounted to one or more portions of the tow truck.

Figure 13:
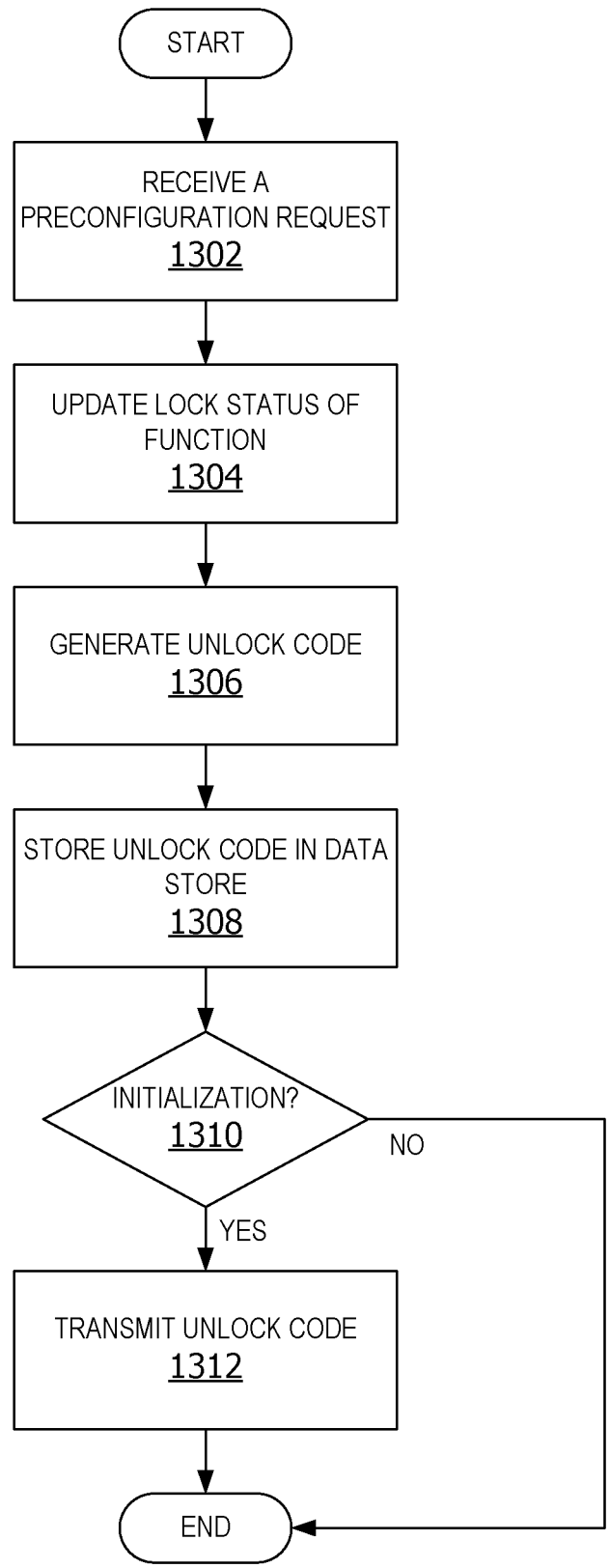
FIG. 13 is an exemplary flow chart illustrating operation of the computing device to pre-configure lockable devices.

FIG. 13 is an exemplary flow chart illustrating operation of the computing device to pre-configure lockable devices. The process shown in FIG. 13 is performed by a device manager component, executing on a computing device, such as the computing device 102 or the user device 116 in FIG. 1.

The process begins by receiving a configuration request at 1302. The request is received from a user device associated with a user prior to initialization of the lockable device. The request is a request to pre-configure a selected lockable function of the lockable device that is in a locked state. The lockable device is a device having one or more lockable functions, such as a multicolor light device and/or a siren device.

The device manager updates the lock status of a selected lockable function of the lockable device at 1304. The lock status is updated from a locked state to a pre-unlocked state. The device manager generates an unlock code 1306. The unlock code is a code which unlocks the selected lockable function. The unlock code is stored by the device manager at a data store, such as, but not limited to, a data table on a data storage device. A determination is made whether the lockable device is being initialized at 1308. Initialization occurs when the lockable device is removed from product packaging and connected to a user device or network during a device registration/initialization process. The process terminates thereafter.

While the operations illustrated in FIG. 13 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 13.

Figure 14:
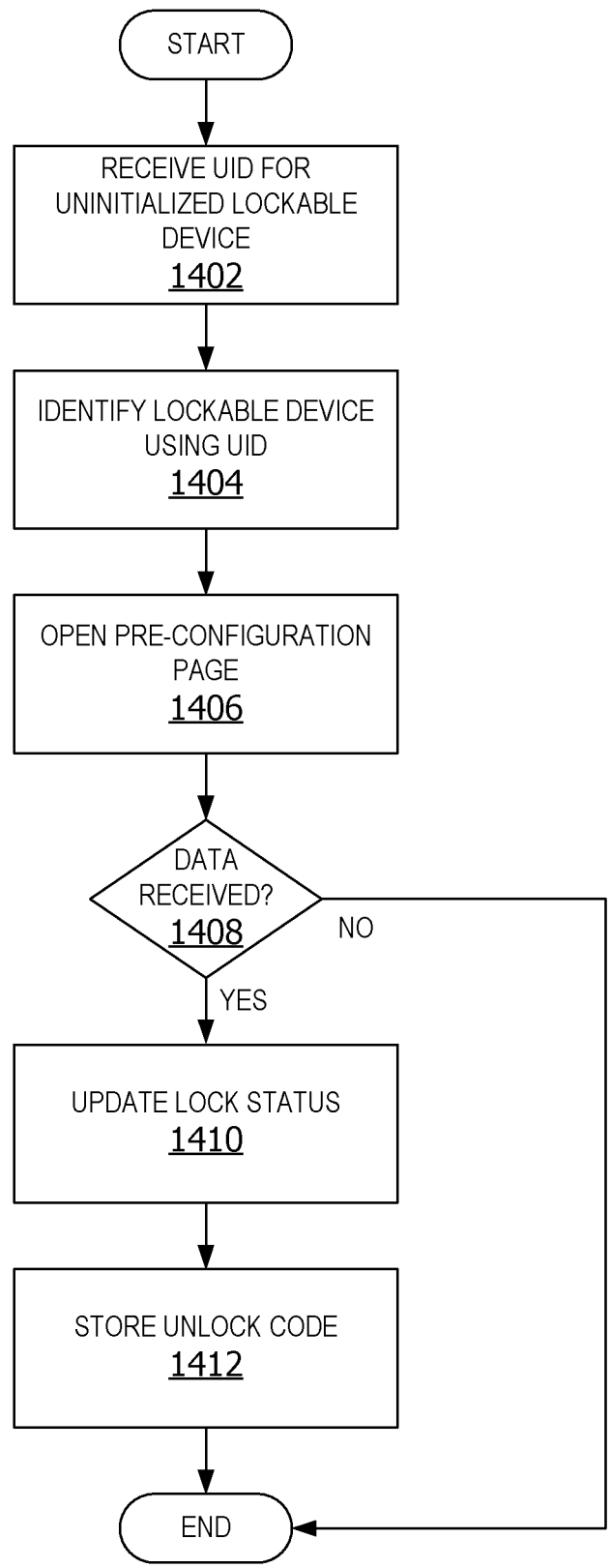
FIG. 14 is an exemplary flow chart illustrating operation of the computing device to enable pre-configuration using a unique identifier (UID) of the lockable device.

Turning now to FIG. 14, an exemplary flow chart illustrating operation of the computing device to enable pre-configuration using a unique identifier (UID) of the lockable device is depicted. The process shown in FIG. 14 is performed by a device manager component, executing on a computing device, such as the computing device 102 or the user device 116 in FIG. 1.

The process begins by receiving a UID for an uninitialized lockable device at 1402. The device manager identifies the lockable device using the UID at 1404. The device manager opens a pre-configuration page at 1406. The pre-configuration page is a webpage having fillable fields in which a user can select functions for pre-configuration. A determination is made whether pre-configuration data is received at 1408. If yes, the lock status of the pre-configured functions are updated at 1410. The lock status is updated in a database, such as a relational database or any other type of data table. An unlock code for unlocking the pre-configured functions is stored until initialization of the lockable device at 1412. The process terminates thereafter.

While the operations illustrated in FIG. 14 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 14.

Figure 15:
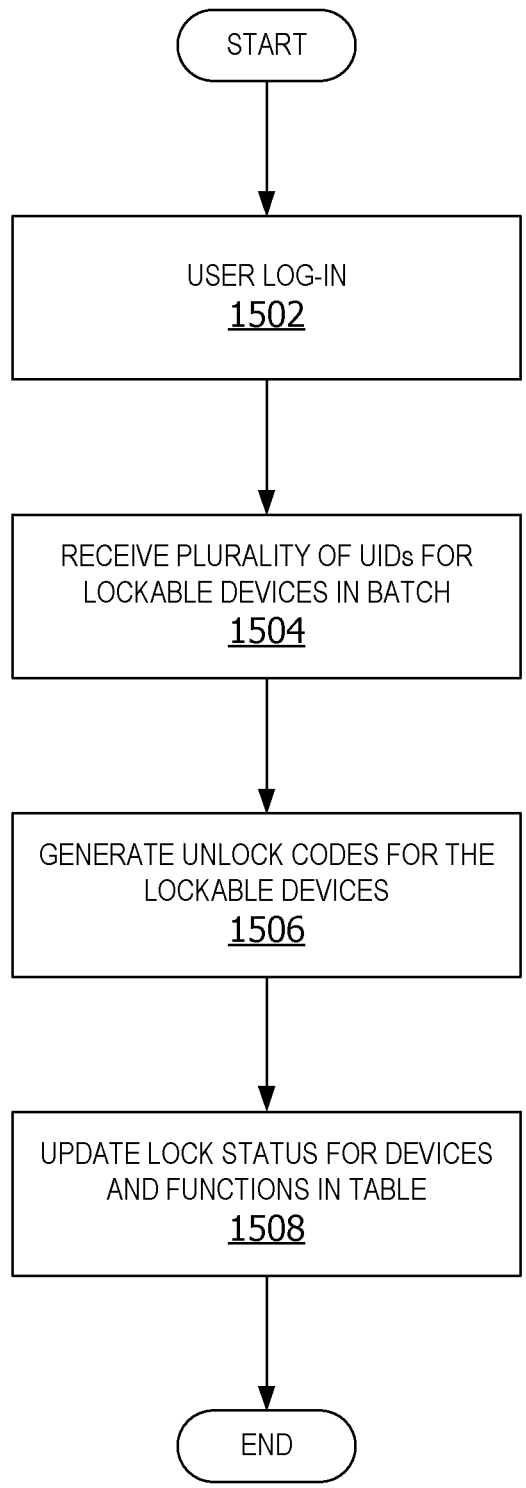
FIG. 15 is an exemplary flow chart illustrating operation of the computing device to generate unlock codes for lockable devices.

FIG. 15 is an exemplary flow chart illustrating operation of the computing device to generate unlock codes for lockable devices. The process shown in FIG. 15 is performed by a device manager component, executing on a computing device, such as the computing device 102 or the user device 116 in FIG. 1.

The process begins when a user logs in to the pre-configuration page at 1502. The device manager receives a plurality of UIDs for a plurality of lockable devices to be preconfigured in a batch at 1504. The device manager generates a plurality of unlock codes for the plurality of lockable devices at 1506. The device manager updates the lock status for each device in the plurality of lockable devices and functions in the table at 1508. The process terminates thereafter.

While the operations illustrated in FIG. 15 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 15.

Figure 16:
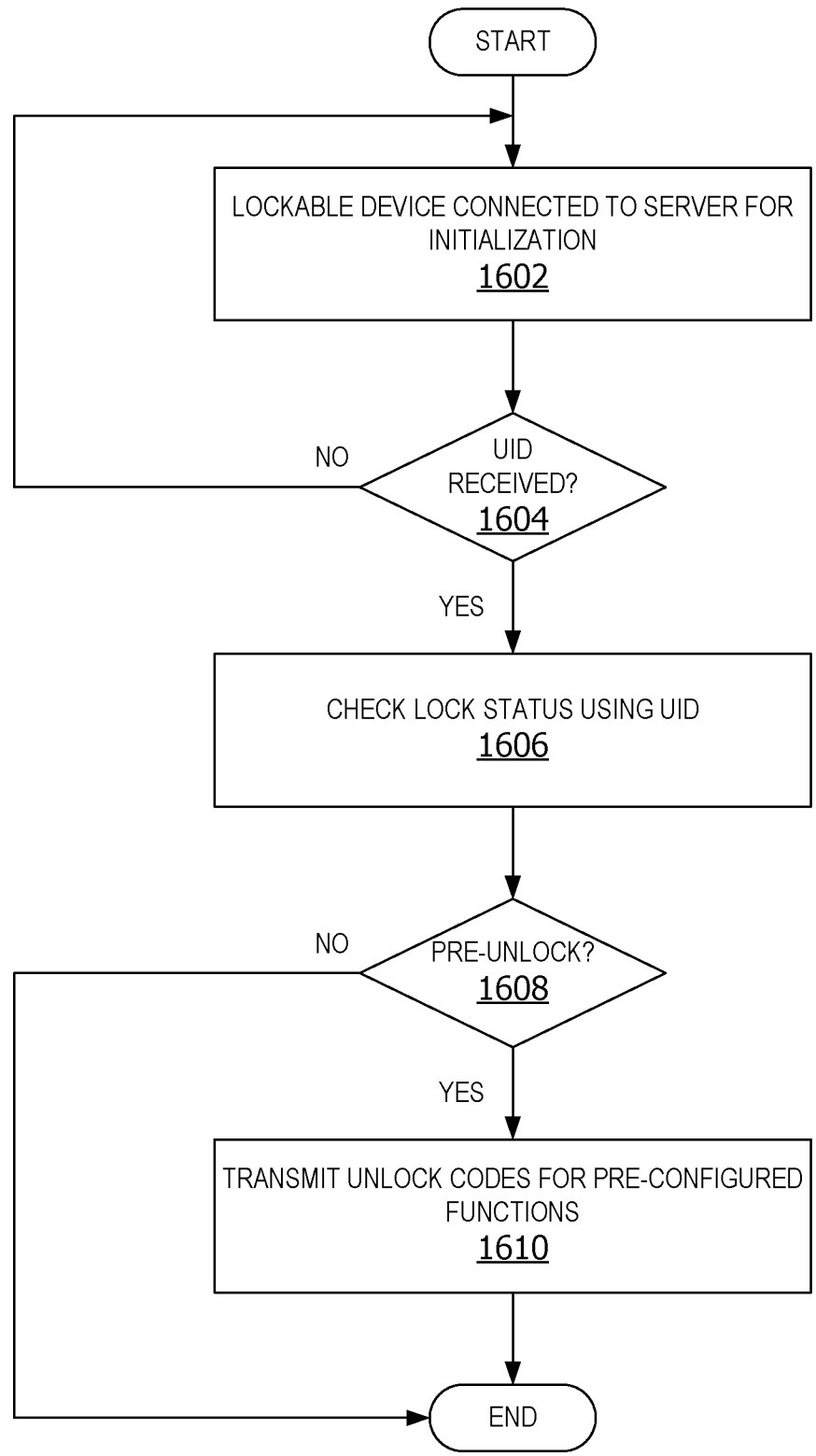
FIG. 16 is an exemplary flow chart illustrating operation of the computing device to unlock pre-configured lockable devices.

FIG. 16 is an exemplary flow chart illustrating operation of the computing device to unlock pre-configured lockable devices. The process shown in FIG. 16 is performed by a device manager component, executing on a computing device, such as the computing device 102 or the user device 116 in FIG. 1.

The process begins when a lockable device is connected to a server for initialization at 1602. The server is a computing device or cloud server hosting the device manager, such as, but not limited to, the computing device 102 and/or the cloud server 118 in FIG. 1. The device manager determines whether the UID for the connected lockable device is received at 1604. If yes, the device manager checks the lock status for each function of the lockable device at 1606. The lock status is stored in a data store, such as, but not limited to, the data storage device 120 in FIG. 1. The device manager determines if any functions are pre-unlocked at 1608. A pre-unlock indicates the function is locked but pre-configured for unlock at initialization. If any function is pre-unlocked at 1608, the device manager automatically transmits the unlock code(s) for pre-configurating the device functions to the user device associated with the lockable device. The user device is a device connected to the lockable device or a user device incorporated within the lockable device. If the unlock code is encrypted, the user device decrypts the unlock code. The unlock code is used to unlock the pre-configured function(s) without additional end-user configuration. The process terminates thereafter.

While the operations illustrated in FIG. 16 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 16.

FIG. 17 is an exemplary screenshot 1700 illustrating a user login screen for logging into a pre-configuration webpage. In this example, a user logs into a portal page or other pre-configuration page provided by a manufacturer or third party managing the locked function licensing. The portal page is provided via a server, such as, but not limited to, a cloud server, a web server, or any other type of server. The server is optionally implemented as a computing device, such as, but not limited to, the computing device 102 in FIG. 1.

In this example, the log-in credentials include the username and password. However, the examples are not limited to the username and password. In other example, different login credentials may be used such as a pin number, biometric data, or any other type of credentials.

In other examples, the biometric data used for login credentials can include biometric data such as fingerprints, voice recognition, facial recognition, etc. The log-in occurs via a user device connected to the remote server via a network connection. Once logged in, the user can access the pre-configuration page to select functions for locking and/or unlocking when the device is initialized.

In other examples, the log-in page includes a "create account" option for new users to create an account. During account creation, the user sets up an account with a username and password or other login credentials.

Figure 18:
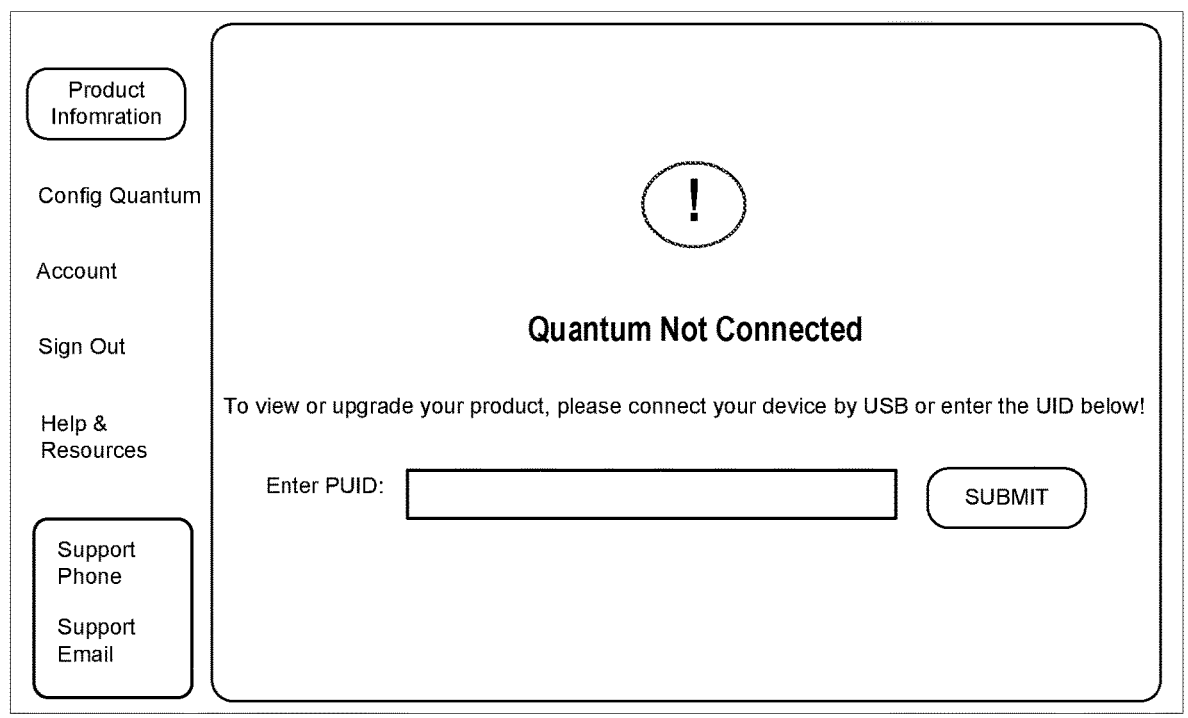
FIG. 18 is an exemplary screenshot 1800 illustrating a text field for entering a lockable device UID during pre-configuration of the lockable siren device.

FIG. 18 is an exemplary screenshot 1800 illustrating a text field for entering a lockable device UID during pre-configuration of the lockable siren device. In this example, the user enters a single UID for a single lockable device into a text field for the product unique identifier (PUID). After entering the product UID, the device manager presents the user with a list of available functions for pre-configuration. In other examples, a user enters multiple UIDs as a batch.

FIG. 19 is an exemplary screenshot 1900 illustrating a pre-configuration page for pre-configuring functions on a lockable device. In this example, the locked function for a siren device is being pre-configured to unlock a 200-Watt amplifier function upon initialization of the siren device. The user can pre-configure additional functions of other devices by entering the UID for each uninitialized lockable device and selecting locked functions which are to be automatically unlocked when the device is initialized.

FIG. 20 is an exemplary screenshot illustrating a pre-configuration page 2000 for pre-configurating functions on a multicolor LED light device. In this example, a user enters a product UID for a given lockable light device. The product UID is also referred to as the PUID in this example.

The pre-configuration page 2000 for the light device includes product information, such as, but without limitation, the product name, PUID, category, version, and unlock level. The history log in this example is blank because the light device has not yet been initialized. The lockable light functions which have been pre-unlocked are shown in the device status section of the pre-configuration page.

Additional Examples

In some examples, the device manager assigns a UID to each lockable device manufactured by a manufacturer. The UID is a serial number of another unique identifier used to identify each device. The UID is encoded on a QR code, matrix barcode, universal product code (UPC), radio frequency identifier (RFID), or other device code. The device code is printed on the exterior of a box or other packaging used to package the lockable device. In other examples, the device code is printed on a label which is placed on the outside of the product packaging (box). The device code is alternatively also placed on a label placed directly on the exterior of a housing or main body of the lockable device. Where the device code is encoded on an RFID tag, the RFID tag is attached directly to the lockable device, attached to the product packaging, placed inside the product packaging, or embedded within the product packaging.

In an example scenario, a dealer receives a plurality of lockable multicolor light devices in an uninitialized and non-configured state in which all lockable functions of the devices are in a locked state except for any default functions which remain unlocked and operational. For example, if the lockable device is a quad color light, the three of the lights are locked and one default light color remains unlocked and operational in the uninitialized and non-configured state. The dealer wants twenty of the light bars to have all four light colors operational. Without pre-configuration the dealer has to unbox each lightbar and connect each lightbar to a computing device to configure the devices prior to shipping to the customer. Otherwise, the customer has to deal with configuring each of the locked color functions before the customer can install the lightbars on their vehicles.

In some examples, the dealer obtains the UID for a device from the device code on each of the lightbars. If the dealer is pre-configuring twenty devices, the dealer uploads or manually enters the twenty UIDs to a pre-configuration webpage to perform a batch pre-configuration process in which all the locked colors are pre-unlocked without unboxing the lightbars or connecting the lightbars to a network. This enables the dealer to provide the pre-configured lightbars to the customers without unboxing or registering the lightbars.

In the example above, when the customer(s) receives the twenty pre-configured lightbars, the customer(s) unboxes each lightbar and connects each lightbar to a user device. The user device transmits the UID for each lightbar to the device manager on the remote server. The device manager automatically transmits the unlock code(s) to unlock all the light functions the connected pre-configured lightbar without requiring the user to go through the process of logging into the device manager server, selecting functions to unlock, and licensing those functions. This is more convenient and efficient for both the dealer and the customer.

In another example scenario, the user receives a batch of ten lockable multicolor lightbars. The user obtains a UID code for each of the ten lightbars from the device code without unboxing the lightbars. The user logs into the device manager website and provides a UID for each lockable device. The user pre-configures the lightbars with the functions desired by the user. The user then provides the lightbars to installation technicians that install the lightbars. At installation, the lightbars are connected to a wired or wireless network, such as with an Internet of Things (IoT) or another network enabled device. The lockable device automatically connects to the device manager server and obtains the unlock codes to unlock the pre-configured functions at installation time without requiring any additional configuration.

In yet another example scenario, a user scans a device code on a lockable siren device using an application on a user device. The device code provides a UID for the siren device to the user device. The user device opens a pre-configuration page on a website hosted by the device manager server. The user selects locked functions to unlock. The locked functions on the siren remain inoperable after pre-configuration. At installation time, the siren device is removed from product packaging and connected to the user device for device registration. During registration of the device, the user provides the UID of the siren device and adds the siren device to a list of lockable devices already registered to the user. The device manager automatically transmits the encrypted unlock code(s) for the siren device which are stored on a data store accessible to the device manager. The user device receives the unlock codes, decrypts them, and provides the unlock codes to the siren device. The siren device uses the unlock codes to automatically unlock the pre-configured functions of the siren device without any further action by the user. The siren device is registered, initialized and ready for installation in this example.

In still another example, a pre-configured multicolored lightbar is shipped from the manufacturer or dealer directly to a customer. The customer unboxes the lightbar and obtains the UID for the lightbar. The user logs into the device manager webpage to add the UID to the user profile for the user without connecting the lightbar to the user device. Upon installation, the lightbar is connected to a network enabled computing device within the emergency vehicle. When connected to the emergency vehicle computing system, the system connects to the device manager server and obtains the unlock code(s) to unlock the pre-configured functions of the lightbar. The functions are automatically unlocked and fully operable when the unlock code(s) are received by the emergency vehicle computing system. In this example, the customer only provides the UID of the lockable device to the device manager system during a registration process. The lockable device is able to connect to the device manager server and obtain the unlock codes at installation onto a vehicle.

In another example, a user enters a batch of UIDs into a pre-configuration page of the device manager server. The device manager server provides pre-configuration options to the user via a user interface. The user selects locked functions to unlock during pre-configuration. The device manager stores unlock codes for unlocking the pre-configured functions until device initialization. At initialization, the lockable device is connected to a user device. The user device connects to the device manager server and provides the UID of the pre-configured lockable device. The device manager server automatically retrieves the stored unlock codes for the pre-configured lockable device and transmits the unlock codes to the user device. The user device provides the unlock code(s) to the connected pre-configured lockable device. The pre-configured lockable device automatically unlocks the pre-configured functions using the provided unlock codes without further user intervention.

In another example, a user uploads a spreadsheet or other list of UIDs associated with uninitialized lockable devices to the device manager server. The device manager server opens a pre-configuration page having pre-configuration options to pre-configure a batch of devices simultaneously. The user selects desired functions to unlock on all the devices in the batch of lockable devices. The lock status of each device associated with the list of UIDs is updated to the pre-unlock state. When any lockable device assigned to a UID in the list of UIDs is connected to the device manager server or connected to a user device which is logged into the device manager server, the device manager server automatically downloads the unlock code(s) to unlock the pre-configured (pre-unlocked) functions for the batch of UIDs. In this manner, it does not matter when a device is initialized or registered, each device in the batch is automatically initialized with the same functions unlocked and enabled such that all the devices in the batch operate in a uniform manner when unboxed by the customer.

The uninitialized lockable device, in some examples, is a lockable device at the manufacturer or dealer prior to shipping the device to the end-user. In other examples, the uninitialized lockable device is a device which has not yet been unboxed by a merchant/dealer or end-user. In such cases, the UID is obtained by scanning a QR code or other scannable device code on the product packaging or label. In still other examples, the uninitialized lockable device is a device which is unregistered and/or which has not yet been connected to a user device or power source prior to installation on a vehicle.

In another example, the device code is a QR code which is read by a barcode reader. The user obtains the UID from the barcode reader by reading the UID on a barcode reader screen, downloading the UID from the barcode reader onto a user device or connecting the barcode reader to the user device via a wired connection, such as a USB connection.

For example, if the lockable device is a multicolor lightbar and a user wants thirty of the lightbars with only two of the colors operable, the QR code on the thirty lockable devices can be quickly and easily scanned using a QR code reader to obtain the thirty UIDs. The UIDs are uploaded as a batch into a pre-configuration application. The pre-configuration application is a software application that connects either wirelessly or wired to upload pre-configurations or download unlock codes to the lockable device. In other examples, the pre-configuration is performed via a webpage or PC Host application in addition to or in place of the webpage. The user pre-configures all the devices simultaneously to automatically unlock only the two desired colors when the lockable devices are eventually registered by one or more end-users.

In still other examples, the lockable device is battery-powered, and network enabled while still packaged in a box or other product packaging. The user obtains the UID for each lockable device from a device code on the lockable device itself, the lockable device packaging, or a label. The label is located on the lockable device, on packaging of the lockable device or a tag on the lockable device. The user logs into the device manager server and enters the UID into a pre-configuration text field on a pre-configuration webpage. The user pre-configures one or more locked functions to unlock automatically. The device manager server transmits the unlock code(s) directly to the network enabled lockable device while the device is still in the original product packaging, in storage prior to shipping to a customer, or otherwise not yet installed on an emergency vehicle. In this example, the device can be fully pre-configured while the lockable device is still sitting on a shelf in the original product packaging.

In still other examples, a user device includes a pre-configuration application installed on the user device. The user opens the pre-configuration application to automatically connect to the device manager server. The user manually enters UIDs into the pre-configuration application by inputting the UID using an input device, such as a keyboard, touchscreen, voice-to-text application, virtual keyboard, etc. In other examples, the user enters the UID by scanning the device code associated with the lockable device or the lockable device packaging. The device manager then opens a set of pre-configuration options enabling the user to set parameters for pre-configurating the device. The parameters specify which functions and sub-functions are to be enabled, as well as any other licensing terms. A sub-function includes any additional options associated with a function. For example, a function associated with a given light color or combination of light colors can also include sub-functions such as flash pattern, flash speed, automatic turn-off, motion sensor activation of the light(s), etc.

In some examples, the user can specify a time and/or date in which the functions unlock. For example, the user can select a function to unlock a function on the first of the coming month or on the first day of the week.

Alternatively, or in addition to the other examples described herein, examples include any combination of the following:

assign a UID to each lockable device at manufacture;

receive the pre-configuration data comprising parameters for unlocking a plurality of lockable functions of the lockable device;

update a status of each lockable function in the plurality of lockable functions from a locked state to a pre-unlocked state in accordance with the parameters;

generate a plurality of unlock codes for unlocking the plurality of locked functions;

upon initialization of the pre-configured lockable device, transmit the plurality of unlock codes to the user device communicatively coupled to the pre-configured lockable device to automatically unlock the plurality of locked functions prior to user configuration of the lockable device at the initialization time;

receive a batch pre-configuration request for a plurality of uninitialized lockable devices, the pre-configuration request comprising a plurality of UIDs associated with the plurality of uninitialized lockable device and identification of a selected lockable function in a locked state to be automatically unlocked at initialization of each device in the plurality of uninitialized lockable devices;

change a lock status of the selected lockable function for each lockable device in the plurality of uninitialized lockable devices from the locked state to a pre-unlocked state in the device management data table;

generate a plurality of unlock codes for unlocking the selected lockable function on each lockable device in the plurality of uninitialized lockable devices;

store the plurality of unlock codes until initialization of each lockable device in the plurality of uninitialized lockable devices;

transmit the plurality of unlock codes to a user device performing initialization of the plurality of lockable devices prior to user configuration of each lockable device;

a first user device, wherein the pre-configuration request is received from the first user device prior to initialization of the lockable device;

a second user device, wherein the unlock code is transmitted to the second user device while the second user device is communicatively coupled to the lockable device during initialization of the lockable device;

transmit the unlock code directly to the lockable device during initialization of the lockable device, wherein the lockable device comprises a network device enabling a wireless network connection between the lockable device and a remote computing device having access to the unlockable device;

wherein the lockable device further comprises a scannable code printed on a label or product packaging associated with the lockable device;

receive scan data from a scanner device used to read data from the scannable code;

identify a UID of the lockable device using the scan data;

enable pre-configuration of the lockable device associated with the identified UID prior to initialization of the lockable device;

wherein the lockable device is a siren device;

receive the pre-configuration data to pre-configure lockable siren functions of the siren device prior to initialization of the siren device, wherein the lockable siren functions comprises a first lockable function and a second lockable function;

update a first lock status of the first lockable function of the siren device from a locked state to a pre-unlocked state in a device management data table in accordance with the pre-configuration data, wherein a second lock status of the second lockable function of the siren device remains in a locked state;

upon initialization of the siren device, transmit the unlock code to unlock the first lockable function automatically prior to user configuration of the siren device;

wherein the first lockable function is unlocked and operable to function;

wherein the second lockable function remains locked and inoperable prior to an initial user configuration of the siren device lockable functions after initialization is complete;

wherein the lockable device is a multicolor light device;

receive the pre-configuration data to pre-configure lockable functions of the multicolor light device prior to initialization of a plurality of lockable light functions;

wherein the plurality of lockable light functions comprises a first lockable light color and a second lockable light color;

wherein a locked light color is inoperable in the locked state;

update a first lock status of the first lockable light color of the multicolor light device from a locked state to a pre-unlocked state in a device management data table in accordance with the pre-configuration data;

wherein a second lock status of the second lockable light color of the multicolor light device remains in a locked state;

upon initialization of the multicolor light device, transmit the unlock code to unlock the first lockable light color function automatically prior to user configuration of the multicolor light device;

wherein the first lockable light color function is unlocked and operable to function, and wherein the second lockable light color function remains locked and inoperable prior to an initial user configuration of the multicolor light device;

receiving a pre-configuration request from a first user device, the pre-configuration request comprising a UID associated with an emergency vehicle lockable device in an uninitialized state and pre-configuration data for unlocking a selected lockable function in a plurality of lockable functions associated with the lockable device, the selected lockable function a locked state rendering the selected lockable function inoperable;

updating a lock status of the selected lockable function from a locked state to a pre-unlocked state in a device management data table;

generating an unlock code for automatically unlocking the selected lockable function of the lockable device during initialization of the lockable device, the unlock code comprising a unique per-device code that unlocks the lockable function;

receiving the UID from a second user device performing an initialization of the lockable device;

transmitting the unlock code to the second user device, wherein the unlock code automatically unlocks the lockable function enabling normal operation of the lockable function prior to user configuration of the plurality of lockable functions of the lockable device;

assigning a first UID to a first lockable device and assigning a second UID to a second lockable device, unique identifier (UID) to an emergency vehicle lockable device in an uninitialized state;

receiving the pre-configuration data comprising parameters for unlocking a plurality of locked functions of the lockable device;

updating a status of each lockable function in the plurality of lockable functions from a locked state to a pre-unlocked state in accordance with the parameters;

transmitting, upon initialization of the lockable device, the plurality of unlock codes to the user device communicatively coupled to the pre-configured lockable device to automatically unlock the plurality of locked functions prior to user configuration of the lockable device at the initialization time;

receiving a batch pre-configuration request for a plurality of uninitialized lockable devices, the pre-configuration request comprising a plurality of UIDs associated with the plurality of uninitialized lockable device and identification of a selected lockable function in a locked state to be automatically unlocked at initialization of each device in the plurality of uninitialized lockable devices;

changing a lock status of the selected lockable function for each lockable device in the plurality of uninitialized lockable devices from the locked state to a pre-unlocked state in the device management data table;

generating a plurality of unlock codes for unlocking the selected lockable function on each lockable device in the plurality of uninitialized lockable devices;

storing the plurality of unlock codes until initialization of each lockable device in the plurality of uninitialized lockable devices; and transmitting the plurality of unlock codes to a user device performing initialization of the plurality of lockable devices prior to user configuration of each lockable device;

the lockable device is a first lockable device and wherein the unlock code is a first unlock code;

generating pre-configuration data for a second lockable device, the pre-configuration data identifying a second lockable function of the second lockable device;

changing a status of the second lockable function from a lock state to a pre-unlock state;

transmitting the second unlock code directly to the second lockable device during initialization of the second lockable device, wherein the second lockable device is pre-configured during the initialization of the second lockable device;

receiving scan data from a scanner device used to read data from a scannable code on a label or packaging associated with the lockable device;

identifying a UID of the lockable device using the scan data;

enabling pre-configuration of the lockable device associated with the identified UID prior to initialization of the lockable device, wherein the pre-configuration automatically unlocks the lockable function enabling operation of the lockable function;

receiving a batch pre-configuration request;

updating a lock status of a selected lockable function for a plurality of lockable devices from the locked state to a pre-unlocked state in accordance with pre-configuration data;

generating a plurality of unlock codes comprising an unlock code for automatically unlocking the lockable function of each lockable device in the plurality of lockable device;

storing the plurality of unlock codes is stored in a data store until initialization of each lockable device in the plurality of lockable devices;

receiving the UID for a pre-configured lockable device in the plurality of lockable device from a user device performing an initialization of the lockable device;

transmitting the unlock code to the user device, wherein the unlock code automatically unlocks the lockable function rendering the lockable function operable in an absence of configuration of the lockable device by a user associated with the user device;

receiving the pre-configuration data comprising parameters for unlocking a plurality of locked functions of the lockable device;

updating a status of each lockable function in the plurality of lockable functions from a locked state to a pre-unlocked state in accordance with the parameters;

generating a plurality of unlock codes for unlocking the plurality of locked functions;

transmitting the plurality of unlock codes to the user device communicatively coupled to the pre-configured lockable device at device initialization time to automatically unlock the plurality of locked functions prior to user configuration of the lockable device;

changing a lock status of the selected lockable function for each lockable device in the plurality of uninitialized lockable devices from the locked state to a pre-unlocked state in the device management data table in a data store;

storing the plurality of unlock codes until initialization of each lockable device in the plurality of uninitialized lockable devices;

transmitting the plurality of unlock codes to a user device performing initialization of the plurality of lockable devices prior to user configuration of each lockable device;

transmitting the unlock code directly to the lockable device, wherein the lockable device is pre-configured to unlock the lockable function during the lockable device initialization in accordance with the pre-configuration data without user configuration of lockable functions on the lockable device;

receiving scan data from a scanner device used to read data from a scannable code on a label or packaging associated with the lockable device;

identifying a UID of the lockable device using the scan data; and enabling pre-configuration of the lockable device associated with the identified UID prior to initialization of the lockable device, wherein the pre-configuration automatically unlocks the lockable function enabling operation of the lockable function.

At least a portion of the functionality of the various elements in FIG. 1, FIG. 2, FIG. 3, FIG. 4, FIG. 5, and FIG. 6 can be performed by other elements in FIG. 1, FIG. 2, FIG. 3, FIG. 4, FIG. 5 and FIG. 6, or an entity (e.g., processor 106, web service, server, application program, computing device, etc.) not shown in FIG. 1, FIG. 2, FIG. 3, FIG. 4, FIG. 5, and FIG. 6.

In some examples, the operations illustrated in FIG. 13, FIG. 14, FIG. 15, and FIG. 16 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of pre-configuring lockable device, the method comprising receiving a pre-configuration request from a first user device, the pre-configuration request comprising a UID associated with an emergency vehicle lockable device in an uninitialized state and pre-configuration data for unlocking a selected lockable function in a plurality of lockable functions associated with the lockable device, the selected lockable function a locked state rendering the selected lockable function inoperable; updating a lock status of the selected lockable function from a locked state to a pre-unlocked state in a device management data table; generating an unlock code for automatically unlocking the selected lockable function of the lockable device during initialization of the lockable device, the unlock code comprising a unique per-device code that unlocks the lockable function; receiving the UID from a second user device performing an initialization of the lockable device; and transmitting the unlock code to the second user device, wherein the unlock code automatically unlocks the lockable function enabling normal operation of the lockable function prior to user configuration of the plurality of lockable functions of the lockable device.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent can take the form of opt-in consent or opt-out consent.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions, or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for pre-configuring lockable devices. For example, the elements illustrated in FIG. 1, FIG. 2, FIG. 3, FIG. 4, FIG. 5, and FIG. 6, such as when encoded to perform the operations illustrated in FIG. 13, FIG. 14, FIG. 15, and FIG. 16, constitute exemplary means for receiving a pre-configuration request, exemplary means for updating a lock status of a lockable function, and exemplary means for transmitting unlock code(s) to unlock pre-configured lockable functions upon initialization of the lockable device.

Other non-limiting examples provide one or more computer storage devices having a first computer-executable instructions stored thereon for providing pre-configuration of lockable functions on emergency vehicle lockable devices. When executed by a computer, the computer performs operations including receiving a batch pre-configuration request for a plurality of uninitialized lockable devices, the pre-configuration request comprising a plurality of UIDs associated with the plurality of uninitialized lockable device and identification of a selected lockable function in a locked state to be automatically unlocked at initialization of each device in the plurality of uninitialized lockable devices; changing a lock status of the selected lockable function for each lockable device in the plurality of uninitialized lockable devices from the locked state to a pre-unlocked state in the device management data table; generating a plurality of unlock codes for unlocking the selected lockable function on each lockable device in the plurality of uninitialized lockable devices; storing the plurality of unlock codes until initialization of each lockable device in the plurality of uninitialized lockable devices; and transmitting the plurality of unlock codes to a user device performing initialization of the plurality of lockable devices prior to user configuration of each lockable device.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either" "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for pre-configuration of a lockable device, the system comprising:
   a processor; and
      a computer-readable medium storing instructions that are operative upon execution by the processor to:
   receive a unique identifier (UID) associated with a lockable device and parameter(s) for unlocking a lockable function of the lockable device;
   update a lock status of the lockable function from a locked state to a pre-unlocked state;
   generate an unlock code for unlocking the lockable function; and
   upon initialization of the lockable device, transmit the unlock code to a user device communicatively coupled to the lockable device, wherein the unlock code is used to automatically unlock the lockable function prior to user configuration of the lockable device.

2. The system of claim 1, wherein the instructions are further operative to:
   receive pre-configuration data comprising parameters for unlocking a plurality of lockable functions of the lockable device;
   update a status of each lockable function in the plurality of lockable functions from the locked state to the pre-unlocked state in accordance with the parameters;
   generate a plurality of unlock codes for unlocking the plurality of locked functions; and
   upon initialization of the lockable device, transmit the plurality of unlock codes to the user device communicatively coupled to the lockable device to automatically unlock the plurality of locked functions prior to user configuration of the lockable device at initialization time.

3. The system of claim 1, wherein the instructions are further operative to:
   receive a batch pre-configuration request for a plurality of lockable devices, the batch pre-configuration request comprising a plurality of UIDs associated with the plurality of lockable device and identification of a selected lockable function in the locked state to be automatically unlocked at initialization of each device in the plurality of lockable devices;
   change a lock status of the selected lockable function for each lockable device in the plurality of lockable devices from the locked state to the pre-unlocked state in a data table;
   generate a plurality of unlock codes for unlocking the selected lockable function on each lockable device in the plurality of lockable devices;
   store the plurality of unlock codes until initialization of each lockable device in the plurality of lockable devices; and
   transmit the plurality of unlock codes to a user device performing initialization of the plurality of lockable devices prior to user configuration of each lockable device.

4. The system of claim 1, further comprising:
   a first user device, wherein a pre-configuration request including the UID and the parameters is received from the first user device prior to initialization of the lockable device; and
   a second user device, wherein the unlock code is transmitted to the second user device while the second user device is communicatively coupled to the lockable device during initialization of the lockable device.

5. The system of claim 1, wherein the instructions are further operative to:
   transmit the unlock code directly to the lockable device during initialization of the lockable device, wherein the lockable device comprises a network device enabling a wireless network connection between the lockable device and a remote computing device having access to the unlock code.

6. The system of claim 1, wherein the lockable device further comprises a scannable code printed on a label or product packaging associated with the lockable device and wherein the instructions are further operative to:
   receive scan data from a scanner device used to read data from the scannable code;
   identify a UID of the lockable device using the scan data; and
   enable pre-configuration of the lockable device associated with the identified UID prior to initialization of the lockable device.

7. The system of claim 1, wherein the lockable device is a siren device, and wherein the instructions are further operative to:
- receive pre-configuration data to pre-configure siren device lockable functions of the siren device prior to initialization of the siren device, wherein the siren device lockable functions comprises a first lockable function and a second lockable function;
- update a first lock status of the first lockable function of the siren device from the locked state to the pre-unlocked state in a device management data table in accordance with the pre-configuration data, wherein a second lock status of the second lockable function of the siren device remains in the locked state; and
- upon initialization of the siren device, transmit the unlock code to unlock the first lockable function automatically prior to user configuration of the siren device, wherein the first lockable function is unlocked and operable to function, and wherein the second lockable function remains locked and inoperable prior to an initial user configuration of the siren device lockable functions after initialization is complete.

8. The system of claim 1, wherein the lockable device is a multicolor light device, and wherein the instructions are further operative to:
- receive pre-configuration data to pre-configure lockable functions of the multicolor light device prior to initialization of a plurality of lockable light functions, wherein the plurality of lockable light functions comprises a first lockable light color and a second lockable light color, wherein a locked light color is inoperable in the locked state;
- update a first lock status of the first lockable light color of the multicolor light device from the locked state to the pre-unlocked state in a device management data table in accordance with the pre-configuration data, wherein a second lock status of the second lockable light color of the multicolor light device remains in the locked state; and
- upon initialization of the multicolor light device, transmit the unlock code to unlock the first lockable light color automatically prior to user configuration of the multicolor light device, wherein the first lockable light color is unlocked and operable to function, and wherein the second lockable light color remains locked and inoperable prior to an initial user configuration of the multicolor light device.

9. A method for pre-configuration of a lockable device, the method comprising:
- receiving a pre-configuration request from a first user device, the pre-configuration request comprising a UID associated with an uninitialized emergency vehicle lockable device and pre-configuration data for unlocking a selected lockable function in a plurality of lockable functions associated with the lockable device, the selected lockable function a locked state rendering the selected lockable function inoperable;
- updating a lock status of the selected lockable function from the locked state to a pre-unlocked state in a device management data table;
- generating an unlock code for automatically unlocking the selected lockable function of the lockable device during initialization of the lockable device, the unlock code comprising a unique per-device code that unlocks the lockable function;
- receiving the UID from a second user device performing an initialization of the lockable device; and
- transmitting the unlock code to the second user device, wherein the unlock code automatically unlocks the lockable function enabling normal operation of the lockable function prior to user configuration of the plurality of lockable functions of the lockable device.

10. The method of claim 9, further comprising:
- assigning a first UID to a first lockable device and assigning a second UID to a second lockable device, unique identifier (UID) to an emergency vehicle lockable device in an uninitialized state.

11. The method of claim 9, further comprising:
- receiving the pre-configuration data comprising parameters for unlocking a plurality of locked functions of the lockable device;
- updating a status of each lockable function in the plurality of lockable functions from the locked state to the pre-unlocked state in accordance with the parameters; and
- transmitting, upon initialization of the lockable device, a plurality of unlock codes to the user device communicatively coupled to the lockable device to automatically unlock the plurality of locked functions prior to user configuration of the lockable device at initialization time.

12. The method of claim 9, further comprising:
- receiving a batch pre-configuration request for a plurality of uninitialized lockable devices, the pre-configuration request comprising a plurality of UIDs associated with the plurality of uninitialized lockable device and identification of a selected lockable function in the locked state to be automatically unlocked at initialization of each device in the plurality of uninitialized lockable devices;
- changing a lock status of the selected lockable function for each lockable device in the plurality of uninitialized lockable devices from the locked state to the pre-unlocked state in the device management data table;
- generating a plurality of unlock codes for unlocking the selected lockable function on each lockable device in the plurality of uninitialized lockable devices;
- storing the plurality of unlock codes until initialization of each lockable device in the plurality of uninitialized lockable devices; and
- transmitting the plurality of unlock codes to a user device performing initialization of the plurality of uninitialized lockable devices prior to user configuration of each lockable device.

13. The method of claim 9, wherein the lockable device is a first lockable device and wherein the unlock code is a first unlock code and further comprising:
- generating pre-configuration data for a second lockable device, the pre-configuration data identifying a second lockable function of the second lockable device;
- changing a status of the second lockable function from the locked state to the pre-unlock state; and
- transmitting a second unlock code directly to the second lockable device during initialization of the second lockable device, wherein the second lockable device is pre-configured during the initialization of the second lockable device.

14. The method of claim 9, further comprising:
- receiving scan data from a scanner device used to read data from a scannable code on a label or packaging associated with the lockable device;
- identifying a UID of the lockable device using the scan data; and enabling pre-configuration of the lockable device associated with the identified UID prior to initialization of the lockable device, wherein the pre-configuration automatically unlocks the lockable function enabling operation of the lockable function.

15. One or more computer storage devices having computer-executable instructions stored thereon, which, upon execution by a computer, cause the computer to perform operations comprising:
updating a lock status of a selected lockable function of a lockable device from a locked state to a pre-unlocked state in accordance with pre-configuration data;
generating an unlock code for automatically unlocking the lockable function;
storing the unlock code is stored in a data store until initialization of the lockable device;
receiving a UID from a user device performing an initialization of the lockable device; and
transmitting the unlock code to the user device, wherein the unlock code automatically unlocks the lockable function rendering the lockable function operable in an absence of configuration of the lockable device by a user associated with the user device.

16. The one or more computer storage devices of claim 15, wherein the operations further comprise:
receiving the pre-configuration data comprising parameters for unlocking a plurality of lockable functions of the lockable device;
updating a status of each lockable function in the plurality of lockable functions from the locked state to the pre-unlocked state in accordance with the parameters;
generating a plurality of unlock codes for unlocking the plurality of locked functions; and
transmitting the plurality of unlock codes to the user device communicatively coupled to the lockable device at device initialization time to automatically unlock the plurality of locked functions prior to user configuration of the lockable device.

17. The one or more computer storage devices of claim 15, wherein the operations further comprise:
receiving a batch pre-configuration request for a plurality of uninitialized lockable devices, the batch pre-configuration request comprising a plurality of UIDs associated with the plurality of uninitialized lockable device and identification of a selected lockable function in the locked state to be automatically unlocked at initialization of each device in the plurality of uninitialized lockable devices;
changing a lock status of the selected lockable function for each lockable device in the plurality of uninitialized lockable devices from the locked state to the pre-unlocked state in a data table;
generating a plurality of unlock codes for unlocking the selected lockable function on each lockable device in the plurality of uninitialized lockable devices;
storing the plurality of unlock codes until initialization of each lockable device in the plurality of uninitialized lockable devices; and
transmitting the plurality of unlock codes to a user device performing initialization of the plurality of uninitialized lockable devices prior to user configuration of each lockable device.

18. The one or more computer storage devices of claim 15, wherein the operations further comprise:
receiving a pre-configuration request from a first user device associated with a first user prior to initialization of the lockable device; and
transmitting the unlock code to a second user device associated with a second user while the second user device is communicatively coupled to the lockable device during initialization of the lockable device.

19. The one or more computer storage devices of claim 15, wherein the user device comprises a computing device within the lockable device, and wherein the operations further comprise:
transmitting the unlock code directly to the lockable device, wherein the lockable device is pre-configured to unlock the lockable function during initialization in accordance with the pre-configuration data without user configuration of lockable functions on the lockable device.

20. The one or more computer storage devices of claim 15, wherein the operations further comprise:
receiving scan data from a scanner device used to read data from a scannable code on a label or packaging associated with the lockable device;
identifying a UID of the lockable device using the scan data; and
enabling pre-configuration of the lockable device associated with the identified UID prior to initialization of the lockable device, wherein the pre-configuration automatically unlocks the lockable function enabling operation of the lockable function in the unlocked state.

* * * * *